United States Patent
Odashima et al.

(10) Patent No.: US 9,567,437 B2
(45) Date of Patent: Feb. 14, 2017

(54) PRODUCTION METHOD OF CYCLIC POLYARYLENE SULFIDE

(71) Applicant: TORAY INDUSTRIES, INC., Tokyo (JP)

(72) Inventors: Tomoyuki Odashima, Nagoya (JP); Syunsuke Horiuchi, Nagoya (JP); Junji Ishibashi, Tokai (JP); Naoto Kumagai, Nagoya (JP); Koji Yamauchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/655,170

(22) PCT Filed: Dec. 26, 2013

(86) PCT No.: PCT/JP2013/007622
§ 371 (c)(1),
(2) Date: Jun. 24, 2015

(87) PCT Pub. No.: WO2014/103317
PCT Pub. Date: Jul. 3, 2014

(65) Prior Publication Data
US 2015/0329677 A1 Nov. 19, 2015

(30) Foreign Application Priority Data

Dec. 27, 2012 (JP) .................. 2012-284546
Jul. 31, 2013 (JP) .................. 2013-158972

(51) Int. Cl.
*C08G 75/14* (2006.01)
*C08G 75/02* (2016.01)
*C07D 341/00* (2006.01)

(52) U.S. Cl.
CPC ............... *C08G 75/14* (2013.01); *C08G 75/02* (2013.01)

(58) Field of Classification Search
CPC ....................................... C08G 75/14
(Continued)

(56) References Cited

U.S. PATENT DOCUMENTS 3,919,177 A 11/1975 Campbell
4,395,741 A 7/1983 Kobayashi
(Continued)

FOREIGN PATENT DOCUMENTS

CN 1500111 5/2004
EP 1550686 7/2005
(Continued)

OTHER PUBLICATIONS

Horiuchi et al; Efficient method for produicng cyclic PAS; Toary Industries; Inc. Japan; 2008; Chem Abstract 149:308577.*
(Continued)

*Primary Examiner* — Duc Truong
(74) *Attorney, Agent, or Firm* — RatnerPrestia

(57) ABSTRACT

There is provided a production method of a cyclic polyarylene sulfide by heating and reacting a raw material mixture (a) including at least a sulfidizing agent, a dihalogenated aromatic compound and an organic polar solvent. The production method continually performs each of an operation (A) of supplying the raw material mixture (a) to a reaction mixture (b) in a reaction vessel which includes a reaction product obtained from the raw material mixture (a), an operation (B) of withdrawing part of the reaction mixture (b) from the reaction vessel, and an operation (C) of heating the reaction vessel.

15 Claims, 1 Drawing Sheet

(58) Field of Classification Search
USPC .................. 528/373, 388; 525/535, 537
See application file for complete search history.

(56) References Cited

U.S. PATENT DOCUMENTS

| | | | |
|---|---|---|---|
| 5,869,599 A | 2/1999 | Hay | |
| 9,150,695 B2* | 10/2015 | Odashima | C07D 341/00 |
| 2010/0137531 A1 | 6/2010 | Horiuchi | |
| 2014/0256907 A1 | 9/2014 | Odashima | |

FOREIGN PATENT DOCUMENTS

| | | |
|---|---|---|
| JP | 453368 | 2/1970 |
| JP | 5212240 | 4/1977 |
| JP | 633375 | 1/1988 |
| JP | 05163349 | 6/1993 |
| JP | 9169844 | 6/1997 |
| JP | 1077408 | 3/1998 |
| JP | 2000191785 | 7/2000 |
| JP | 3200027 | 8/2001 |
| JP | 2002265602 | 9/2002 |
| JP | 2004123958 | 4/2004 |
| JP | 2008285596 | 11/2008 |
| JP | 2009007521 | 1/2009 |
| JP | 2009030012 | 2/2009 |
| JP | 2010037550 | 2/2010 |
| JP | 2011068885 | 4/2011 |
| JP | 2011149014 | 8/2011 |
| JP | 2012092319 | 5/2012 |
| JP | 2013032512 | 2/2013 |
| JP | 2013241590 | 12/2013 |
| WO | 2008105438 | 9/2008 |
| WO | 2013061561 | 5/2013 |

OTHER PUBLICATIONS

Odajima et al; Manufacture of cyclic poly(PAS); Toary Insdustries, Inc. Japan; 2011; Chem Abstract 155:242023.*
International Search Report for International Application No. PCT/JP2013/007622 mailed Apr. 1, 2014.
Zimmerman, D. et al., "Polymerization of poly (p-phenylene sulfide) from a cyclic precursor," 1996, pp. 3111-3116, vol. 37, No. 14, Polymer.
Decision to Grant a Patent for Japanese Application No. 2014-502694, dated May 18, 2015.

* cited by examiner

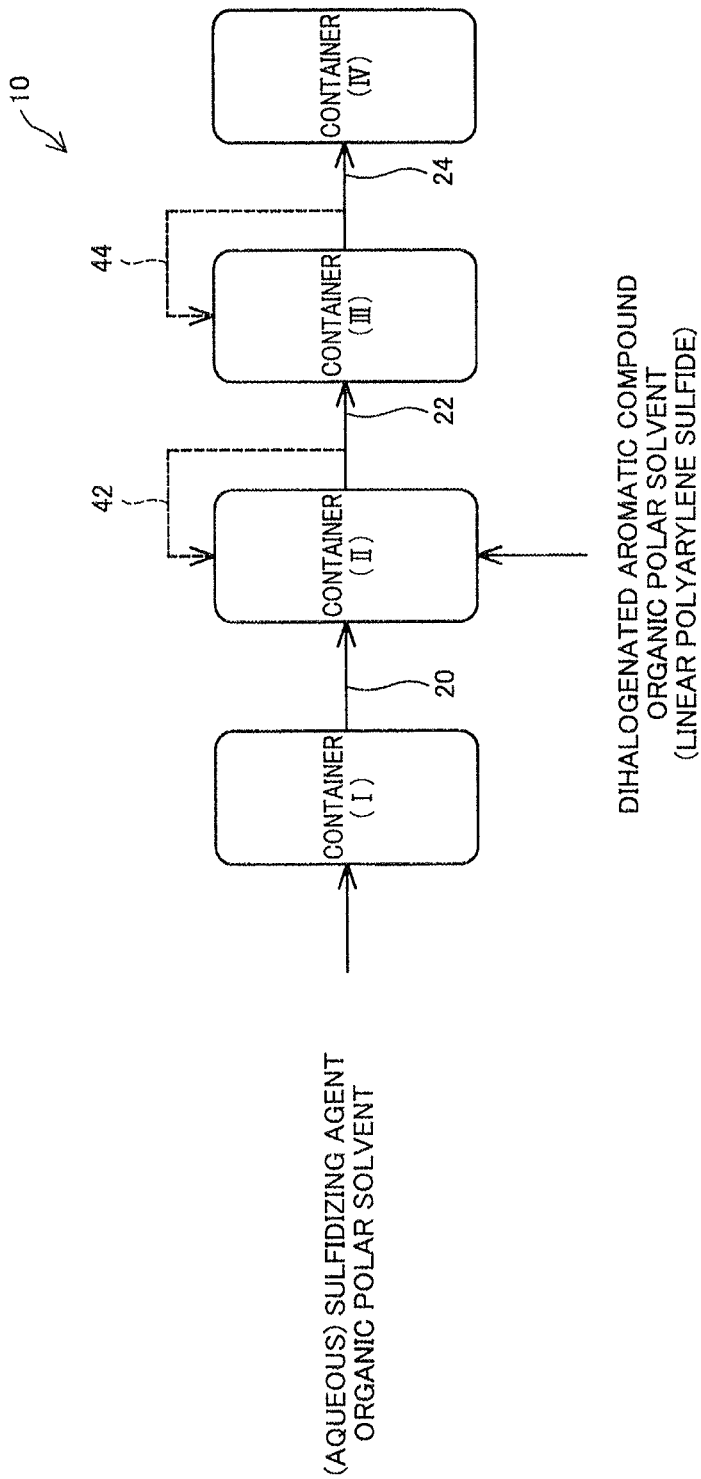

PRODUCTION METHOD OF CYCLIC POLYARYLENE SULFIDE

CROSS-REFERENCE TO RELATED APPLICATIONS

The present application is the national phase of PCT/JP2013/007622 filed on Dec. 26, 2013 and claims priority from Japanese Patent Application No. 2012-284546 filed on Dec. 27, 2012 and Japanese Patent Application No. 2013-158972 filed on Jul. 31, 2013, the entirety of disclosures of which is hereby incorporated by reference into this application.

FIELD OF THE INVENTION

The invention relates to a production method of a cyclic polyarylene sulfide. More specifically, the invention relates to a simple and economical method of producing a cyclic polyarylene sulfide with high efficiency.

BACKGROUND OF THE INVENTION

Cyclic aromatic compounds have recently received attention, because of the characteristics derived from their cyclic conformation, i.e., their structure-derived specificity. More specifically, the cyclic aromatic compounds have potential for development in applications of high-performance materials or functional materials and are expected to be used as inclusion compounds or to be used as monomers effective for syntheses of high molecular-weight linear polymers by ring-opening polymerization. Cyclic polyarylene sulfides (hereinafter polyarylene sulfide may be abbreviated as PAS) are remarkable compounds belonging to the category of cyclic aromatic compounds.

As a production method of cyclic polyarylene sulfide, disclosed are, for example, a method of oxidative polymerization of a diaryl disulfide compound under an ultra-dilute condition (for example, Patent Document 1) and a method of heating a copper salt of 4-bromothiophenol in quinoline an ultra-dilute condition (for example, Patent Document 2). These methods, however, require the ultra-dilute condition as essential. These methods produce cyclic polyarylene sulfide with high selectivity and suppress production of linear polyarylene sulfide to a very little amount, but requires a long time for the reaction and allows for production of only a very little amount of cyclic polyarylene sulfide per unit volume of a reaction vessel. These methods accordingly have lots of difficulties in terms of producing cyclic polyarylene sulfide with high efficiency. Another problem is difficulty in purification, so that the cyclic polyarylene sulfide obtained has low purity.

As a method of producing cyclic polyarylene sulfide by desalination condensation from versatile raw materials like a sulfidizing agent and a dihalogenated aromatic compound, disclosed is a method of controlling the amount of sodium sulfide relative to N-methylpyrrolidone to 0.1 mol/liter and performing contact reaction at a reflux temperature by addition of dichlorobenzene (for example, Non-Patent Document 1). This method employs the dilute condition that the volume of an organic polar solvent is 1.25 liters or more per 1 mol of sulfur atom of the sulfidizing agent and is thus expected to obtain cyclic polyarylene sulfide. This method, however, allows for production of only a very little amount of cyclic polyarylene sulfide. Other problems are low purity of the resulting cyclic polyarylene sulfide and a long time required for the reaction.

As a method of producing high-purity cyclic polyarylene sulfide with high yield using the similar raw materials, disclosed is a method of heating a reaction mixture including a sulfidizing agent and a dihalogenated aromatic compound at a temperature exceeding a reflux temperature under ordinary pressure by using an organic polar solvent of 1.25 liters or more relative to 1 mol of sulfur of the sulfidizing agent (for example, Patent Document 3). This method enables the consumption rate of the dihalogenated aromatic compound to reach about 90% in a relatively short time period like 0.5 to 2 hours and improves the selectivity of cyclic polyarylene sulfide to about 35%. Improvement of the selectivity, however, requires the diluter condition, so that only a little amount of cyclic polyarylene sulfide is obtained per unit volume of a reaction vessel at even the high yield. There is accordingly a need to satisfy both the yield and the production amount.

As a method proposed to solve the above problem, disclosed is a method of heating and reacting a linear polyarylene sulfide, a sulfidizing agent and a dihalogenated aromatic compound in 1.25 liters or more of an organic polar solvent per 1 mol of sulfur content included in the reaction mixture (for example, Patent Document 4). This method uses the linear polyarylene sulfide as the raw material and thereby reduces the amount of the monomer used. This accordingly improves the yield of cyclic polyarylene sulfide relative to the monomer and is expected to have industrial applicability. This method, however, still has a little amount of cyclic polyarylene sulfide obtained per volume of a reaction vessel. There is accordingly a need for improvement of the production amount.

As a similar method, disclosed is a method of heating and reacting a reaction mixture including at least a linear polyarylene sulfide, a sulfidizing agent and an organic polar solvent, adding a dihalogenated aromatic compound to the resulting reaction mixture, and further heating and reacting the resulting reaction mixture in 1.25 liters or more of the organic polar solvent per 1 mol of sulfur content included in the reaction mixture (for example, Patent Document 5). This method also uses the linear polyarylene sulfide as the raw material and thereby reduces the amount of the monomer used. This method, however, employs the multi-step reaction and requires the complicated operations including dilution of the reaction mixture and separate addition of the dihalogenated aromatic compound. This method also has a little amount of cyclic polyarylene sulfide obtained per volume of a reaction vessel. There is accordingly a need for further improvement of efficiency.

As a method of producing polyarylene sulfide, disclosed is a method of causing a monomer mixture including at least one species of sulfur source selected from alkali metal sulfides and alkali metal hydrosulfides, a dihalogenated aromatic compound and an organic polar solvent to be supplied to a polymerization line provided with a continuous tubular reactor including a static blending structure and to pass through the polymerization line during progress of polymerization (for example, Patent Document 6). This method aims to suppress the production cost of the polyarylene sulfide and does not refer to production of a cyclic polyarylene sulfide at all. Furthermore, this method uses the solvent of less than 1.25 liters per 1 mol of sulfur content of the sulfur source and is thus expected to have only a low yield even if cyclic polyarylene sulfide is produced. This method is accordingly not efficient as the production method of the cyclic polyarylene sulfide.

Patent Documents:
Patent Document 1: JP 3200027B (claims)
Patent Document 2: U.S. Pat. No. 5,869,599 (page 14)
Patent Document 3: JP 2009-30012A (claims)
Patent Document 4: WO 2008/105438 (claims)
Patent Document 5: JP 2011-68885A (claims)
Patent Document 6: JP 2008-285596A (claims)
Non-Patent Documents:
Non-Patent Document 1: Polymer, vol. 37, No. 14, p 3111-3112, 1996

SUMMARY OF THE INVENTION

In order to solve at least part of the problems described above, an object of the invention is to provide an economical and simple method of producing a cyclic polyarylene sulfide with high efficiency.

Aspects of the invention include at least part of configurations described below, in order to solve at least part of the above problems.

[1] There is provided a production method of a cyclic polyarylene sulfide by heating and reacting a raw material mixture (a) including at least a sulfidizing agent, a dihalogenated aromatic compound and an organic polar solvent. The production method continually performs each of an operation (A) of supplying the raw material mixture (a) to a reaction mixture (b) in a reaction vessel which includes a reaction product obtained from the raw material mixture (a), an operation (B) of withdrawing part of the reaction mixture (b) from the reaction vessel, and an operation (C) of heating the reaction vessel.

[2] There is provided the production method of the cyclic polyarylene sulfide according to [1] above, wherein a volume of the organic polar solvent included in the reaction mixture (b) is not less than 1.25 liters and not greater than 50 liters per 1 mol of sulfur atom of the sulfidizing agent.

[3] There is provided the production method of the cyclic polyarylene sulfide according to either [1] or [2] above, wherein a constant relationship is maintained between each of a sulfur content and an amount of arylene unit included in the reaction mixture (b) in the reaction vessel to a volume of organic polar solvent.

[4] There is provided the production method of the cyclic polyarylene sulfide according to any one of [1] to [3] above, which performs the operation (A) and the operation (B) simultaneously.

[5] There is provided the production method of the cyclic polyarylene sulfide according to any one of [1] to [4] above, which performs the operation (A) and the operation (B) continuously.

[6] There is provided the production method of the cyclic polyarylene sulfide according to any one of [1] to [5] above, wherein an amount of the reaction mixture (b) in the reaction vessel is kept constant.

[7] There is provided the production method of the cyclic polyarylene sulfide according to any one of [1] to [6], wherein a concentration of unreacted sulfidizing agent and a concentration of unreacted dihalogenated aromatic compound included in the reaction mixture (b) in the reaction vessel are respectively maintained to be not higher than 30% of a concentration of the sulfidizing agent and a concentration of the dihalogenated aromatic compound included in the raw material mixture (a), and an amount of the unreacted sulfidizing agent and an amount of the unreacted dihalogenated aromatic compound included in 1 kilogram of the reaction mixture (b) are respectively maintained to be not greater than 0.15 mol.

[8] There is provided the production method of the cyclic polyarylene sulfide according to any one of [1] to [7] above, which additionally performs an operation (D) of heating the reaction mixture (b) withdrawn from the reaction vessel by the operation (B).

[9] There is provided the production method of the cyclic polyarylene sulfide according to any one of [1] to [8] above, wherein the operation (C) heats the reaction vessel at a temperature exceeding a reflux temperature under ordinary pressure.

[10] There is provided the production method of the cyclic polyarylene sulfide according to any one of [1] to [9] above, wherein the dihalogenated aromatic compound is dichlorobenzene.

[11] There is provided the production method of the cyclic polyarylene sulfide according to any one of [1] to [10] above, wherein the sulfidizing agent is an alkali metal sulfide.

[12] There is provided the production method of the cyclic polyarylene sulfide according to any one of [1] to [11] above, wherein the raw material mixture (a) includes a linear polyarylene sulfide.

[13] There is provided the production method of the cyclic polyarylene sulfide according to any one of [1] to [12] above, which starts the operation (A) and the operation (B) after obtaining the reaction mixture (b) in advance by reaction of the raw material mixture (a) in a batch system.

[14] There is provided the production method of the cyclic polyarylene sulfide according to any one of [1] to [13] above, wherein the operation (B) uses a centrifugal pump to adjust an amount of withdrawal of the reaction mixture (b).

[15] There is provided the production method of the cyclic polyarylene sulfide according to any one of [1] to [14] above, wherein the reaction vessel is provided with a circulation line connected with the reaction vessel and arranged to circulate the reaction mixture (b) into and from the reaction vessel by using a pump, and the operation (B) withdraws the reaction mixture (b) from the reaction vessel via the circulation line.

[16] There is provided the production method of the cyclic polyarylene sulfide according to any one of [1] to [15] above, wherein the reaction vessel is linked by a pressure equalizing line with a supply container connected with the reaction vessel and configured to supply the raw material mixture (a) to the reaction vessel by the operation (A) and/or a receiving container connected with the reaction vessel and configured to receive a supply of the reaction mixture (b) withdrawn from the reaction vessel by the operation (B), so that pressures in the reaction vessel and the supply container and/or the receiving container are equalized.

The present invention provides a production method of a cyclic polyarylene sulfide and more specifically an economical and simple method of producing a cyclic polyarylene sulfide with high efficiency.

Especially, employing the method of the invention enables a cyclic polyarylene sulfide to be produced at a high formation rate.

BRIEF DESCRIPTION OF THE DRAWINGS

FIG. 1 is a diagram illustrating the general configuration of a reaction device.

DETAILED DESCRIPTION OF EMBODIMENTS OF THE INVENTION

The following describes embodiments of the invention.
(1) Sulfidizing Agent
The sulfidizing agent used according to an embodiment of the invention may be any sulfidizing agent that serves to introduce a sulfide bond into a dihalogenated aromatic compound and acts on an arylene sulfide bond to produce an arylene thiolate. The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide and mixtures of two or more among these alkali metal sulfides. Among them, lithium sulfide and/or sodium sulfide are preferably used, and sodium sulfide is more preferably used. Any of these alkali metal sulfides may be used as a hydrate or an aqueous mixture or in the form of an anhydride. The aqueous mixture herein indicates an aqueous solution, a mixture of an aqueous solution and a solid component or a mixture of water and a solid component. Commonly available, inexpensive alkali metal sulfides are in the form of hydrates or aqueous mixtures, so that it is preferable to use an alkali metal sulfide in such a form.

Specific examples of the alkali metal hydrosulfide include lithium hydrosulfide, sodium hydrosulfide, potassium hydrosulfide, rubidium hydrosulfide, cesium hydrosulfide and mixtures of two or more selected among these alkali metal hydrosulfides. Among them, lithium hydrosulfide and/or sodium hydrosulfide are preferably used, and sodium hydrosulfide is more preferably used.

An alkali metal sulfide produced in a reaction system of an alkali metal hydrosulfide and an alkali metal hydroxide may also be used. An alkali metal sulfide prepared in advance by exposure of an alkali metal hydrosulfide to an alkali metal hydroxide may also be used. Any of these alkali metal hydrosulfides and alkali metal hydroxides may be used in the form of a compound selected among a hydrate, an aqueous mixture and an anhydride. The hydrate or the aqueous mixture is preferable in terms of the availability and the cost.

Additionally, an alkali metal sulfide produced in a reaction system of an alkali metal hydroxide such as lithium hydroxide or sodium hydroxide and hydrogen sulfide may be used. An alkali metal sulfide prepared in advance by exposure of an alkali metal hydroxide such as lithium hydroxide or sodium hydroxide to hydrogen sulfide may also be used. Hydrogen sulfide may be used in any of gas form, liquid form and aqueous solution form.

In the case that there is a partial loss of the sulfidizing agent by, for example, dehydration prior to start of the reaction with the dihalogenated aromatic compound, the amount of the sulfidizing agent according to the embodiment of the invention means a remaining amount calculated by subtracting the loss from an actual amount added as the raw material.

An alkali metal hydroxide and/or an alkaline earth metal hydroxide may be used in combination with the sulfidizing agent. Preferable examples of the alkali metal hydroxide specifically include sodium hydroxide, potassium hydroxide, lithium hydroxide, rubidium hydroxide, cesium hydroxide and mixtures of two or more selected among these alkali metal hydroxides. Specific examples of the alkaline earth metal hydroxide include calcium hydroxide, strontium hydroxide and barium hydroxide. Among them, sodium hydroxide is preferably used.

When the alkali metal hydrosulfide is used as the sulfidizing agent, it is especially preferable to use an alkali metal hydroxide simultaneously. In this case, the used amount of the alkali metal hydroxide is, for example, equal to or more than 0.95 mol, is preferably equal to or more than 1.00 mol and is more preferably equal to or more than 1.005 mol per 1 mol of the alkali metal hydrosulfide. The used amount of the alkali metal hydroxide is also, for example, equal to or less than 1.50 mol, is preferably equal to or less than 1.25 mol and is more preferably equal to or less than 1.200 mol per 1 mol of the alkali metal hydrosulfide.

When hydrogen sulfide is used as the sulfidizing agent, it is especially preferable to use an alkali metal hydroxide simultaneously. In this case, the used amount of the alkali metal hydroxide is, for example, equal to or more than 2.0 mol, is preferably equal to or more than 2.01 mol and is more preferably equal to or more than 2.04 mol per 1 mol of hydrogen sulfide. The used amount of the alkali metal hydroxide is also, for example, equal to or less than 3.0 mol, is preferably equal to or less than 2.50 mol and is more preferably equal to or less than 2.40 mol per 1 mol of hydrogen sulfide.

(2) Dihalogenated Aromatic Compound

The dihalogenated aromatic compound used according to the embodiment of the invention is an aromatic compound having an arylene group that is a divalent aromatic ring group and two halogeno groups. One mole of the dihalogenated aromatic compound has one mole of the arylene unit and two moles of the halogeno group. Examples of a compound having a phenylene group that is a divalent benzene ring group as the arylene group and two halogeno groups include dihalogenated benzenes such as p-dichlorobenzene, o-dichlorobenzene, m-dichlorobenzene, p-dibromobenzene, o-dibromobenzene, m-dibromobenzene, 1-bromo-4-chlorobenzene and 1-bromo-3-chlorobenzene. Other examples of the dihalogenated aromatic compound include compounds having additional substituents other than halogeno groups, such as 1-methoxy-2,5-dichlorobenzene, 1-methyl-2,5-dichlorobenzene, 1,4-dimethyl-2,5-dichlorobenzene, 1,3-dimethyl-2,5-dichlorobenzene and 3,5-dichlorobenzoic acid. Among them, preferable are dihalogenated aromatic compounds including p-dihalogenated benzene like p-dichlorobenzene as the primary component. Especially preferable is a dihalogenated aromatic compound including 80 to 100 mol % of p-dichlorobenzene, and more preferable is a dihalogenated aromatic compound including 90 to 100 mol % of p-dichlorobenzene. Two or more different dihalogenated aromatic compounds may be used in combination, in order to obtain a cyclic polyarylene sulfide (hereinafter also called cyclic PAS) copolymer.

(3) Organic Polar Solvent

In production of the cyclic PAS according to the embodiment of the invention, an organic polar solvent is used as the reaction solvent, and an organic amide solvent is especially preferably used. As concrete examples, N-alkyl pyrrolidones such as N-methyl-2-pyrrolidone, N-ethyl-2-pyrrolidone and N-cyclohexyl-2-pyrrolidone, caprolactams such as N-methyl-ε-caprolactam and aprotic organic solvents such as 1,3-dimethyl-2-imidazolidinone, N,N-dimethylacetamide, N,N-dimethylformamide and hexamethylphosphoric triamide and mixtures thereof are preferably used, because of their high reaction stability. Among them, N-methyl-2-pyrrolidone and 1,3-dimethyl-2-imidazolidinone are preferably used.

(4) Cyclic Polyarylene Sulfide

The cyclic polyarylene sulfide according to the embodiment of the invention is a cyclic compound including the repeating unit expressed by the formula —(Ar—S)— as the main constituent unit and preferably containing 80 mol % or more of this repeating unit, such as a compound expressed by the following general formula (A):

[Chem. 1]

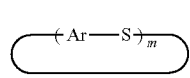
(A)

Ar herein represents an arylene group and may be a unit expressed by any of the following formula (B) to formula (M). Among them, the formula (B) to the formula (K) are preferable; the formula (B) and the formula (C) are more preferable; and the formula (B) is especially preferable.

[Chem. 2]

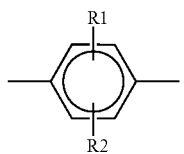
(B)

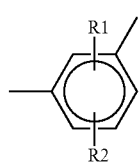
(C)

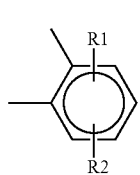
(D)

(wherein R1 and R2 in formulae represent substituents selected among hydrogen, alkyl groups containing one to six carbon atoms, alkoxy groups containing one to six carbon atoms and halogeno groups, wherein R1 and R2 may be identical or may be different).

[Chem. 3]

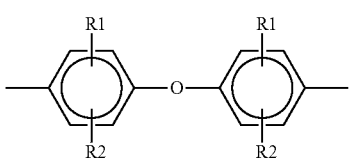
(E)

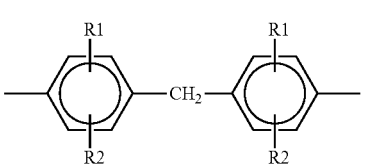
(F)

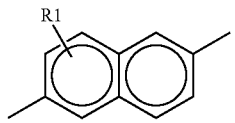
(G)

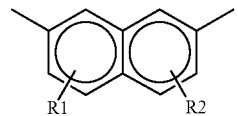
(H)

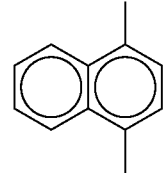
(I)

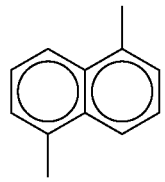
(J)

(K)

(wherein R1 and R2 in formulae represent substituents selected among hydrogen, alkyl groups containing one to six carbon atoms, alkoxy groups containing one to six carbon atoms and halogeno groups, wherein R1 and R2 may be identical or may be different).

[Chem. 4]

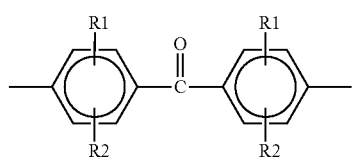
(L)

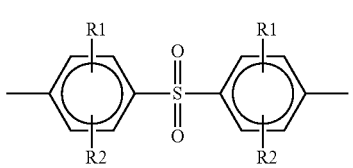
(M)

(wherein R1 and R2 in formulae represent substituents selected among hydrogen, alkyl groups containing one to six carbon atoms, alkoxy groups containing one to six carbon atoms and halogeno groups, wherein R1 and R2 may be identical or may be different).

The cyclic polyarylene sulfide may be a random copolymer or a block copolymer including the repeating unit of, for example, any of the above formula (B) to formula (M) or a mixture thereof. Typical examples of the cyclic polyarylene sulfide according to the embodiment of the invention include cyclic polyphenylene sulfides, cyclic polyphenylene sulfide sulfones, cyclic polyphenylene sulfide ketones, cyclic random copolymers and cyclic block copolymers including any of these cyclic polymers and mixtures thereof. As the cyclic polyarylene sulfide according to the embodiment of the invention, cyclic polyphenylene sulfide containing 80 mol % or more of a p-phenylene sulfide unit as the main constituent unit is preferable, and cyclic polyphenylene sulfide containing 90 mol % or more of the p-phenylene sulfide unit is especially preferable:

[Chem. 5]

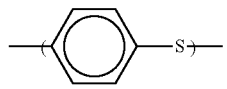

The repeating number m in the cyclic polyarylene sulfide of the above formula (A) is not specifically limited, but m is preferably 4 to 50, is more preferably 4 to 30 and is furthermore preferably 4 to 25. Controlling the number m to the above range suppresses the melting temperature of the cyclic polyarylene sulfide from increasing excessively. As described later, in production of a high molecular-weight polyarylene sulfide using a polyarylene sulfide prepolymer containing a cyclic polyarylene sulfide as the raw material (hereinafter the high molecular-weight polyarylene sulfide obtained from the polyarylene sulfide prepolymer used as the raw material may simply be called polyarylene sulfide or PAS), it is preferable to heat this polyarylene sulfide prepolymer at the melting temperature of the polyarylene sulfide prepolymer. This enables the polyarylene sulfide to be produced with high efficiency.

When the repeating number m of the cyclic polyarylene sulfide is in the above range, the melting temperature of the cyclic PAS is likely to be equal to or lower than 275° C., preferably equal to or lower than 260° C. and more preferably equal to or lower than 255° C. The polyarylene sulfide prepolymer including this cyclic PAS thereby tends to have the lower melting temperature. The repeating number m of the cyclic PAS in the above range is accordingly preferable, since this allows for the lower setting of the heating temperature of the polyarylene sulfide prepolymer in production of the polyarylene sulfide. The melting temperature of the cyclic PAS or the polyarylene sulfide denotes a peak temperature of an endothermic peak observed in differential scanning calorimetry when the temperature is raised to 360° C. at a scan rate of 20° C./minute after being kept at 50° C. for 1 minute.

The cyclic polyarylene sulfide according to the embodiment of the invention may be a single compound having a single repeating number or a mixture of cyclic polyarylene sulfides having different repeating numbers. The mixture of the cyclic polyarylene sulfides having the different repeating numbers, however, tends to have the lower melting temperature and the less amount of heat required for melting and is thus more preferable, compared with the single compound having the single repeating number.

In the cyclic polyarylene sulfide according to the embodiment of the invention, the ratio of the content of the cyclic PAS of the above formula (A) having m=6 to the total amount of the cyclic polyarylene sulfide ([cyclic PAS of m=6 (weight)]/[cyclic PAS mixture (weight)]×100(%)) is preferably less than 50% by weight, is more preferably less than 40% by weight and is furthermore preferably less than 30% by weight. For example, Patent Document JP H10-77408A discloses a method of producing cyclohexa(p-phenylene sulfide), which is a cyclic PAS having the repeating number m=6 and including para-phenylene sulfide unit as Ar. The cyclic PAS of m=6 is regarded to have a melting peak temperature at 348° C., and an extremely high processing temperature is required to process this cyclic PAS. Accordingly, in production of the polyarylene sulfide using the polyarylene sulfide prepolymer containing the cyclic polyarylene sulfide, in terms of further decreasing the temperature required for heating, the cyclic PAS according to the embodiment of the invention preferably has the content of the cyclic PAS of the above formula (A) specifically having m=6 controlled to the above range.

Similarly, in terms of further decreasing the temperature required for melt processing in production of the polyarylene sulfide, the embodiment of the invention preferably uses the mixture of the cyclic polyarylene sulfides having the different repeating numbers as the cyclic PAS in the raw materials used for production of the polyarylene sulfide, as described above. More specifically, it is preferable to use a cyclic PAS mixture including 5% by weight or more of respective cyclic PASes having m=5 to 8, on the assumption that the total amount of cyclic PASes of the above formula (A) having m=4 to 13 is equal to 100% by weight among the cyclic PASes included in the cyclic PAS mixture. It is more preferable to use a cyclic PAS mixture including 7% by weight or more of the respective cyclic PASes having m=5 to 8. The cyclic PAS mixture having such a composition ratio tends to specifically reduce the melting peak temperature and decrease the amount of melting heat and is thus especially preferable in terms of decreasing the melting temperature.

The content rate of each of the cyclic PASes having different repeating numbers m to the total amount of the cyclic polyarylene sulfides in the cyclic PAS mixture may be determined as the ratio of a peak area attributed to a simple cyclic PAS having a desired repeating number m to a total peak area attributed to cyclic PASes in component separation of the cyclic PAS mixture by high-performance liquid chromatography using an UV detector. The respective peaks obtained in component separation by high-performance liquid chromatography are qualitatively analyzed by isolating each peak by preparative liquid chromatography and performing infrared spectroscopy for absorption spectral analysis and mass spectrometry.

(5) Linear Polyarylene Sulfide

A linear polyarylene sulfide (hereinafter may be abbreviated as linear PAS) according to the embodiment of the invention is a linear homopolymer or a linear copolymer including a repeating unit expressed by the formula —(Ar—S)— as the main constituent unit and preferably containing 80 mol % or more of this repeating unit. Available examples of Ar include the units shown by the above formula (B) to formula (M). Among them, the unit of formula (B) is especially preferable.

The linear polyarylene sulfide including this repeating unit as the main constituent unit may additionally include a small amount of a branch unit or a crosslinking unit, for example, any of those shown by the following formula (N) to formula (Q). The copolymerization amount of this branch unit or crosslinking unit is preferably in the range of 0 to 1 mol % relative to 1 mol of the main constituent unit expressed by —(Ar—S)—.

[Chem. 6]

-continued

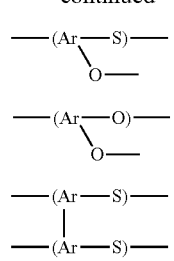

The linear PAS according to the embodiment of the invention may be a random copolymer or a block copolymer including any of the above repeating units or a mixture thereof.

Typical examples of the linear PAS include polyphenylene sulfides, polyphenylene sulfide sulfones, polyphenylene sulfide ketones, their random copolymers, their block copolymers and mixtures thereof. Especially preferable examples of the linear PAS are polyphenylene sulfides (hereinafter may be abbreviated as PPS), polyphenylene sulfide sulfones and polyphenylene sulfide ketones containing 80 mol % or more of or preferably 90 mol % or more of a p-phenylene sulfide unit as the main constituent unit of the polymer:

[Chem. 7]

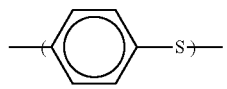

In the production method of the cyclic PAS according to the embodiment of the invention, the linear PAS may be used as the raw material. The melt viscosity of the linear PAS used in this application is not specifically limited but may be in the range of 0.1 to 1000 Pa·s (300° C., shear rate of 1000/second) as the melt viscosity of common linear PAS and more specifically in the range of 0.1 to 500 Pa·s. The molecular weight of the linear PAS is also not specifically limited, but common PAS may be used as the linear PAS. The weight-average molecular weight of this PAS may be equal to or more than 5,000, is preferably equal to or more than 7,500 and is more preferably equal to or more than 10,000. The weight-average molecular weight of the PAS may also be equal to or less than 1,000,000, is preferably equal to or less than 500,000 and is more preferably equal to or less than 100,000. The above weight-average molecular weight of the linear PAS is the value expressed in terms of standard polystyrene. In general, the lower weight-average molecular weight increases the solubility in an organic polar solvent and thereby advantageously reduces the time required for the reaction. The linear PAS having the weight-average molecular weight of the above range is usable without causing any essential problem.

The production method of such linear PAS is not specifically limited, but the linear PAS used may be produced by any manufacturing process. For example, the linear PAS may be produced by the method described in the published documents, for example, JP S45-3368B, S52-12240B and S63-3375B. More specifically, the linear PAS may be produced by the reaction of an aromatic compound containing at least one nucleus-substituted halogen or thiophene with an alkali metal sulfide in a polar organic solvent at a raised temperature. Preferably the linear PAS may be produced by the method described in the published documents, for example, JP H05-163349A. More specifically, the linear PAS may be produced by exposure of a dihalogenated aromatic compound to a sulfidizing agent in an organic polar solvent. A wide range of molded products using the PAS produced by any of these methods and molding waste, as well as waste plastics derived from the PAS produced by any of these methods and off-specification products may also be used as the linear PAS.

The reaction for producing a cyclic compound is generally competing reactions of producing the cyclic compound and producing a linear compound. In a method for producing a cyclic polyarylene sulfide, a considerable amount of a linear polyarylene sulfide is accordingly produced as a byproduct, other than the cyclic polyarylene sulfide as the objective substance. The embodiment of the invention enables this linear polyarylene sulfide obtained as the byproduct to be used as the raw material without any difficulty. For example, an especially preferable process uses, as the raw material, a linear polyarylene sulfide obtained by separating a cyclic polyarylene sulfide from a resulting polyarylene sulfide mixture including the cyclic polyarylene sulfide and the linear polyarylene sulfide by the production method of cyclic PAS described in the above Patent Document 3, i.e., the method of heating a sulfidizing agent and a dihalogenated aromatic compound using 1.25 liters or more of an organic polar solvent per 1 mol of the sulfur content in the sulfidizing agent. Another preferable process uses, as the raw material, a linear polyarylene sulfide obtained by separating a cyclic polyarylene sulfide from a resulting polyarylene sulfide mixture including the cyclic polyarylene sulfide and the linear polyarylene sulfide by the production method of cyclic PAS described in the above Patent Document 4, i.e., the method of heating a linear polyarylene sulfide, a sulfidizing agent and a dihalogenated aromatic compound using 1.25 liters or more of an organic polar solvent per 1 mol of the sulfur content in the reaction mixture.

Furthermore, a particularly preferable process uses a linear polyarylene sulfide obtained by separating a cyclic polyarylene sulfide from a resulting polyarylene sulfide mixture including the cyclic polyarylene sulfide and the linear polyarylene sulfide by a production method of a cyclic polyarylene sulfide by heating and reacting a raw material mixture (a) including at least a sulfidizing agent, a dihalogenated aromatic compound and an organic polar solvent. This production method continually performs each of an operation (A) of supplying the raw material mixture (a) to a reaction mixture (b) in a reaction vessel which includes a reaction product obtained from the raw material mixture (a), an operation (B) of withdrawing part of the reaction mixture (b) from the reaction vessel, and an operation (C) of heating the reaction vessel.

A linear compound, for example, a low molecular-weight linear polyarylene sulfide produced as a byproduct in production of a cyclic polyarylene sulfide has conventionally been discarded as useless. Production of a cyclic compound accordingly has problems of a large amount of waste caused by this linear compound as the byproduct and a low yield relative to the raw material monomer. The embodiment of the invention enables the linear polyarylene sulfide as the byproduct to be used as the raw material. This is of great significance in terms of significantly reducing the amount of waste and drastically improving the yield relative to the raw material monomer.

The form of the linear polyarylene sulfide used for production of the cyclic PAS is not specifically limited, but may be powder, particle, granule or pellet in the dried state. The linear polyarylene sulfide may be used in the state that includes an organic polar solvent which is the reaction solvent or may be used in the state that includes a third component which does not essentially interfere with the reaction. The third component may be, for example, an inorganic filler or an alkali metal halide. The alkali metal halide herein includes any combinations of alkali metals (i.e., lithium, sodium, potassium, rubidium and cesium) and halogens (i.e., fluorine, chlorine, bromine, iodine and astatine). Specific examples include lithium chloride, sodium chloride, potassium chloride, lithium bromide, sodium bromide, potassium bromide, lithium iodide, sodium iodide, potassium iodide and cesium fluoride. Preferable are the alkali metal halides produced by reaction of the sulfidizing agent and the dihalogenated aromatic compound described above. Examples of the alkali metal halide produced by combination of an easily available sulfidizing agent and an easily available dihalogenated aromatic compound are lithium chloride, sodium chloride, potassium chloride, lithium bromide, sodium bromide, potassium bromide and sodium iodide. Among them, sodium chloride, potassium chloride, sodium bromide and potassium bromide are preferable, and sodium chloride is more preferable. The linear polyarylene sulfide used may be in the form of a resin composition including the inorganic filler or the alkali metal halide.

In the production method of the cyclic polyarylene sulfide according to the embodiment of the invention, the linear PAS is produced as the byproduct as described above. The melt viscosity of the linear PAS produced according to the embodiment of the invention is not specifically limited but may be in the range of 0.1 to 1000 Pa·s (300° C., shear rate of 1000/second) as the melt viscosity of common linear PAS and in the range of 0.1 to 500 Pa·s as the easily producible range. The molecular weight of the linear PAS is also not specifically limited, but the lower limit of the weight-average molecular weight of common PAS may be not less than 1,000. The weight-average molecular weight of the linear PAS produced by the production method of the cyclic polyarylene sulfide according to the embodiment of the invention is likely to be not less than 2,500 and is more likely to be not less than 5,000. The upper limit of the weight-average molecular weight of common PAS may be not greater than 1,000,000. The weight-average molecular weight of the linear PAS produced by the production method of the cyclic polyarylene sulfide according to the embodiment of the invention is likely to be not greater than 500,000 and is more likely to be not greater than 100,000. The above weight-average molecular weight of the linear PAS is the value expressed in terms of standard polystyrene. The higher weight-average molecular weight generally results in the stronger expression of the characteristics of the linear PAS and thus tends to facilitate separation of the cyclic PAS from the linear PAS as described later. The linear PAS having the weight-average molecular weight of the above range is usable without causing any essential problem.

(6) Production Method of Cyclic Polyarylene Sulfide

According to the embodiment of the invention, there is provided the production method of a cyclic polyarylene sulfide by heating and reacting a raw material mixture (a) including at least a sulfidizing agent, a dihalogenated aromatic compound and an organic polar solvent. The production method is characterized by continually performing an operation (A) of supplying the raw material mixture (a) to a reaction mixture (b) in a reaction vessel which includes a reaction product obtained from the raw material mixture (a), an operation (B) of withdrawing part of the reaction mixture (b) from the reaction vessel, and an operation (C) of heating the reaction vessel. This method continually produces the cyclic polyarylene sulfide of constant quality with high formation rate and accordingly achieves the high productivity. The following sequentially describes the details of a substrate concentration, the raw material mixture (a), the reaction mixture (b), the operation (A) and the operation (B) according to the embodiment of the invention and other embodiments.

(6-1) Substrate Concentration

In the description herein, a substrate concentration is defined by the relationship between the amount (mole number) of the sulfur content or the arylene unit and the amount of the organic polar solvent in the raw material mixture (a) or in the reaction mixture (b) (in the description hereafter, may be collectively referred to as reaction mixture or the like) as described below in detail. In other words, in the description herein, the substrate concentration of the sulfur content denotes the amount of the organic polar solvent per sulfur content in the reaction mixture or the like. The substrate concentration of the arylene unit denotes the amount of the organic polar solvent per arylene unit in the reaction mixture or the like.

More specifically, the substrate concentration of the sulfur content is defined by the amount of the organic polar solvent per 1 mol of the sulfur content in the reaction mixture or the like. The molar amount of the sulfur content in the reaction mixture or the like is synonymous with the molar amount of sulfur atom present in the reaction mixture or the like. For example, when 1 mol of an alkali metal sulfide is present but no other sulfur-containing component is present in the reaction mixture or the like, the sulfur content included in the reaction mixture or the like is equivalent to 1 mol. When 0.5 mol of an alkali metal sulfide and 0.5 mol of the arylene sulfide unit are present in the reaction mixture or the like, the sulfur content included in the reaction mixture or the like is also equivalent to 1 mol.

In the stage that the reaction of the raw material mixture (a) or more specifically the reaction of the sulfidizing agent and the dihalogenated aromatic compound supplied as the raw materials does not proceed, when the sulfidizing agent is the only raw material having sulfur atom, the sulfur content included in the raw material mixture (a) means the sulfur content derived from the sulfidizing agent. In the reaction mixture (b) or in the raw material mixture (a) including the linear polyarylene sulfide, the sulfur content in the reaction mixture or the like means the sum of the sulfur content derived from the sulfidizing agent included in the reaction mixture or the like and the sulfur content derived from an arylene sulfide compound present in the reaction mixture or the like.

The arylene sulfide compound is generally produced by reaction of the sulfidizing agent, the dihalogenated aromatic compound and/or the linear polyarylene sulfide. Accordingly, with progress of the reaction, the arylene sulfide unit equivalent to the consumed amount of the sulfidizing agent is newly produced in the reaction mixture. In other words, unless the sulfidizing agent included in the reaction mixture is removed from, depleted in or added to the reaction mixture, the sulfur content included in the reaction mixture is substantially unchanged from the material supply stage, irrespective of the progress of the reaction. Accordingly, the substrate concentration of the sulfur content is substantially unchanged even in the stage that the reaction proceeds, unless the organic polar solvent is removed from, depleted in or added to the reaction mixture.

The embodiment of the invention is characterized by continually performing each of the operation (A) of supplying the raw material mixture (a) to the reaction mixture (b) in the reaction vessel including the reaction product obtained from the raw material mixture (a) and the operation (B) of withdrawing part of the reaction mixture (b) from the reaction vessel. The sulfur content and the amount of the organic polar solvent may be varied in the reaction mixture (b). In the absence of removal, depletion or addition of the sulfur content or the organic polar solvent to significantly change the composition rate of the sulfur content and the organic polar solvent in the reaction mixture (b), however, irrespective of the progress of each of the above operations or the progress of the reaction, the substrate concentration of the sulfur content included in the reaction mixture (b) is thought to be always constant.

The sulfur content in the reaction mixture or the like may be obtained by quantitatively determining the sulfur content derived from the sulfidizing agent and the amount of the arylene sulfide compound present in the reaction mixture or the like. The amount of the sulfidizing agent in the reaction mixture or the like may be determined by ion chromatography described later. The amount of the arylene sulfide compound in the reaction mixture or the like may be determined from the solid content obtained by the process of dispersing part of the reaction mixture or the like in a large excess of water to recover a water-insoluble component and drying the recovered component.

In the case that the substrate concentration of the sulfur content in production of the cyclic PAS according to the embodiment of the invention is shown by the above definition, the amount of the organic polar solvent per 1 mol of the sulfur content in the reaction mixture or the like is preferably not less than 1.25 liters, is more preferably not less than 1.5 liters and is furthermore preferably not less than 2 liters in terms of the production efficiency of the cyclic PAS. The amount of the organic polar solvent per 1 mol of the sulfur content in the reaction mixture or the like is also preferably not greater than 50 liters, is more preferably not greater than 20 liters and is furthermore preferably not greater than 15 liters in terms of the manufacturing efficiency per volume of the reaction vessel. The amount of the solvent herein is shown by the volume of the solvent at ordinary temperature and ordinary pressure.

When the used amount of the organic polar solvent is less than 1.25 liters per 1 mol of the sulfur content, this significantly decreases the formation rate of the cyclic PAS by reaction of the sulfidizing agent and the dihalogenated aromatic compound, while increasing the formation rate of the linear PAS as the byproduct in production of the cyclic PAS. Accordingly this leads to poor productivity of the cyclic PAS per unit raw material.

The formation rate of the cyclic PAS denotes the ratio of the sulfur content included in the cyclic PAS per 1 mol of the entire sulfur content in the reaction mixture (b) in production of the cyclic PAS described later in detail. Accordingly, the formation rate of the cyclic PAS equal to 100% means that the sulfur content is entirely present as the cyclic polyarylene sulfide in the reaction mixture (b).

It is preferable to increase the amount of the organic polar solvent per 1 mol of the sulfur content, in terms of efficiently converting the sulfur-containing raw material to an objective substance (cyclic PAS). In production of the cyclic PAS, excessively increasing the amount of the organic polar solvent used to achieve the remarkably high formation rate, however, tends to decrease the amount of the cyclic PAS produced per unit volume of the reaction mixture (b) and tends to increase the time required for the reaction. Additionally, in the case of an operation of isolating and recovering the cyclic PAS, the excessively large amount of the organic polar solvent leads to production of an extremely small amount of the cyclic polyarylene sulfide per unit volume of the reaction mixture (b) and accordingly makes it difficult to recover the cyclic polyarylene sulfide. In terms of satisfying both the formation rate of the cyclic polyarylene sulfide and the productivity, it is preferable to control the amount of the organic polar solvent to the above range.

The general manufacturing procedure of a cyclic compound often uses an extremely large amount of the solvent and does not enable the cyclic compound to be obtained with high efficiency when the used amount of the solvent is in the preferable range according to the embodiment of the invention. Compared with the general manufacturing procedure of a cyclic compound, the embodiment of the invention enables the cyclic PAS to be obtained with high efficiency even under the condition that the used amount of the solvent is relatively small or more specifically under the condition that the used amount of the solvent is equal to or less than the upper limit of the above preferable range. This reason is not clear at the moment but may be attributed to the following. The method according to the preferable embodiment of the invention performs the reaction at the temperature exceeding the reflux temperature of the reaction mixture and thereby has extremely high reaction efficiency and a high consumption rate of the raw materials. This may favorably affect production of the cyclic compound.

Like the above sulfur content, the substrate concentration of the arylene unit is defined by the amount of the organic polar solvent per 1 mol of the arylene unit in the reaction mixture or the like. The molar amount of the arylene unit in the reaction mixture or the like is synonymous with the molar amount of the arylene unit present in the reaction mixture or the like. For example, when 1 mol of a dihalogenated aromatic compound is present but no other arylene unit-containing component is present in the reaction mixture or the like, the arylene unit included in the reaction mixture or the like is equivalent to 1 mol. When 0.5 mol of a dihalogenated aromatic compound and 0.5 mol of the arylene sulfide unit are present in the reaction mixture or the like, the arylene unit included in the reaction mixture or the like is also equivalent to 1 mol.

In the stage that the reaction of the raw material mixture (a) or more specifically the reaction of the sulfidizing agent and the dihalogenated aromatic compound supplied as the raw materials does not proceed, when the dihalogenated aromatic compound is the only raw material having the arylene unit, the arylene unit included in the raw material mixture (a) means the arylene unit derived from the dihalogenated aromatic compound. In the reaction mixture (b) or in the raw material mixture (a) including the linear polyarylene sulfide, the arylene unit included in the reaction mixture or the like means the sum of the arylene unit derived from the dihalogenated aromatic compound included in the reaction mixture or the like and the arylene unit derived from an arylene sulfide compound present in the reaction mixture or the like.

The arylene sulfide compound is generally produced by reaction of the sulfidizing agent, the dihalogenated aromatic compound and/or the linear polyarylene sulfide. Accordingly, with progress of the reaction, the arylene sulfide compound equivalent to the consumed amount of the dihalogenated aromatic compound is newly produced. In other words, unless the arylene unit included in the reaction mixture is removed from, depleted in or added to the reaction mixture, the arylene unit included in the reaction mixture is substantially unchanged from the material supply stage, irrespective of the progress of the reaction. Accordingly, the substrate concentration of the arylene unit is substantially unchanged even in the stage that the reaction proceeds, unless the organic polar solvent is removed from, depleted in or added to the reaction mixture.

The embodiment of the invention is characterized by continually performing each of the operation (A) of supplying the raw material mixture (a) to the reaction mixture (b) in the reaction vessel including the reaction product obtained from the raw material mixture (a) and the operation (B) of withdrawing part of the reaction mixture (b) from the reaction vessel. The arylene unit and the amount of the organic polar solvent may be varied in the reaction mixture (b). In the absence of removal, depletion or addition of the arylene unit or the organic polar solvent to significantly change the composition rate of the arylene unit and the organic polar solvent in the reaction mixture (b), however, irrespective of the progress of each of the above operations or the progress of the reaction, the substrate concentration of the arylene unit included in the reaction mixture (b) is thought to be always constant.

The amount of the arylene unit in the reaction mixture or the like may be obtained by quantitatively determining the amount of the arylene unit derived from the dihalogenated aromatic compound and the amount of the arylene sulfide compound present in the reaction mixture or the like. The amount of the arylene unit in the reaction mixture or the like may be determined by gas chromatography described later. The amount of the arylene sulfide compound in the reaction mixture or the like may be determined from the solid content obtained by the process of dispersing part of the reaction mixture or the like in a large excess of water to recover a water-insoluble component and drying the recovered component.

As described above, the substrate concentration of the arylene unit in production of the cyclic PAS according to the embodiment of the invention is defined by the amount of the organic polar solvent per 1 mol of the arylene unit in the reaction mixture or the like. In the case that the substrate concentration of the arylene unit in production of the cyclic PAS according to the embodiment of the invention is shown by the above definition, the amount of the organic polar solvent per 1 mol of the arylene unit in the reaction mixture or the like is preferably not less than 0.63 liters, is more preferably not less than 1.00 liters and is furthermore preferably not less than 1.67 liters. The amount of the organic polar solvent per 1 mol of the arylene unit in the reaction mixture or the like is also preferably not greater than 55 liters, is more preferably not greater than 22 liters and is furthermore preferably not greater than 16 liters.

In production of the cyclic PAS according to the embodiment of the invention, it is preferable to determine the substrate concentration of the arylene unit in the reaction mixture or the like by taking into account the substrate concentration of the sulfur content described above. The arylene unit in the reaction mixture or the like is preferably not less than 0.90 mol, is more preferably not less than 0.92 mol and is furthermore preferably not less than 0.95 mol per 1 mol of the sulfur content in the reaction mixture or the like. The arylene unit is also preferably not greater than 2.00 mol, is more preferably not greater than 1.50 mol and is furthermore preferably not greater than 1.20 mol per 1 mol of the sulfur content in the reaction mixture or the like. Controlling the arylene unit in the reaction mixture or the like tends to increase the formation rate of the cyclic PAS and allows for production of the cyclic PAS with high efficiency.

In production of the cyclic PAS according to the embodiment of the invention, it is preferable to maintain a constant level of substrate concentration in the reaction mixture (b) or more specifically to maintain a constant relationship of the sulfur content and the amount of the arylene unit in the reaction mixture (b) to the amount of the organic polar solvent. Herein "maintaining a constant level of substrate concentration" means that the substrate concentration in the reaction mixture (b) has a small variation and is maintained in a certain range during as well as before and after each of the operation (A) of supplying the raw material mixture (a) to the reaction mixture (b) in the reaction vessel including the reaction product obtained from the raw material mixture (a) and/or the operation (B) of withdrawing part of the reaction mixture (b) from the reaction vessel, which are characteristic of the embodiment of the invention.

More specifically, maintaining a constant level of substrate concentration of the sulfur content in the reaction mixture (b) means that the variation range of the substrate concentration of the sulfur content is within ±30% relative to the substrate concentration before each of the above operations. This variation range is more preferably within ±20%, is furthermore preferably within ±15%, is much more preferably within ±10% and is especially preferably within ±5%. Even in the case of a variation in substrate concentration of the sulfur content, the amount of the organic polar solvent per 1 mol of the sulfur content in the reaction mixture (b) is preferably not less than 1.25 liters and not greater than 50 liters.

Maintaining a constant level of substrate concentration of the arylene unit in the reaction mixture (b) means that the variation range of the amount of the arylene unit per 1 mol of the sulfur content in the reaction mixture or the like is within ±30% relative to the amount of the arylene unit per 1 mol of the sulfur content in the reaction mixture or the like before each of the above operations, when the substrate concentration of the sulfur content is specified. The variation range of the amount of the arylene unit per 1 mol of the above sulfur content is more preferably within ±20%, is furthermore preferably within ±15%, is much more preferably within ±10% and is especially preferably within ±5%.

The method described below causes the substrate concentration in the reaction mixture (b) to be substantially unchanged from the substrate concentration in the raw material mixture (a) and thereby enables a constant level of substrate concentration to be maintained in the reaction mixture (b), irrespective of the control method of each of the operation (A) and/or the operation (B) described above. Maintaining the substrate concentration in the reaction mixture (b) in the above range satisfies both the formation rate of the cyclic PAS and the productivity and enables the cyclic PAS to be produced with high efficiency. The higher substrate concentration, however, tends to decrease the formation rate of the cyclic PAS in the reaction mixture (b), while the lower substrate temperature tends to decrease the consumption rate of the raw materials and increase the time required for the reaction.

(b-2) Raw Material Mixture (a)

The raw material mixture (a) according to the embodiment of the invention is comprised of raw material components that include a sulfidizing agent, a dihalogenated aromatic compound and an organic polar solvent as the essential components. The raw material mixture (a) may further include a linear PAS and may additionally include a third component that does not significantly interfere with the reaction or a third component that has the advantageous effect of accelerating the reaction, in addition to the above essential components. The composition of the raw material mixture (a) is based on the composition of all the raw material components at the time point of supply into a reaction vessel, and the entire raw material components supplied are regarded as the raw material mixture (a).

As long as the respective raw material components are fully supplied into the reaction vessel as the raw material mixture (a), there are no specific limitations on the mixing method, the preparation method and the supply method. For example, the respective raw materials, i.e., the sulfidizing agent, the dihalogenated aromatic compound and the organic polar solvent may be separately supplied into the reaction vessel, or two or more of such raw materials may be mixed in advance and then supplied into the reaction vessel. In terms of easily maintaining a constant level of substrate concentration in the reaction mixture (b), an especially preferable method of preparation mixes in advance at least the sulfidizing agent, the dihalogenated aromatic compound and the organic polar solvent according to a desired substrate concentration.

In preparation of the raw material mixture (a), the amount of the organic polar solvent is preferably not less than 1.25 liters, is more preferably not less than 1.5 liters and is furthermore preferably not less than 2 liters per 1 mol of the sulfur content in the raw material mixture (a). The amount of the organic polar solvent is also preferably not greater than 50 liters, is more preferably not greater than 20 liters and is furthermore preferably not greater than 15 liters per 1 mol of the sulfur content. The amount of the solvent herein is shown by the volume of the solvent at ordinary temperature and ordinary pressure.

In preparation of the raw material mixture (a), the amount of the arylene unit is preferably not less than 0.90 mol, is more preferably not less than 0.92 mol and is furthermore preferably not less than 0.95 mol per 1 mol of the sulfur content in the raw material mixture (a). The amount of the arylene unit is also preferably not greater than 2.00 mol, is more preferably not greater than 1.50 mol and is furthermore preferably not greater than 1.20 mol per 1 mol of the sulfur content.

Controlling the composition of the raw material mixture (a) to the above range is a preferable procedure, in order to maintain the substrate concentration of the reaction mixture (b) in the above desired range and efficiently produce the cyclic PAS. In order to maintain a constant level of substrate concentration in the reaction mixture (b), it is preferable to maintain a constant level of substrate concentration in the raw material mixture (a) in the above desired range of substrate concentration. Maintaining a constant level of substrate concentration in the raw material mixture (a) means that the variation range of the substrate concentration is within ±30% relative to the substrate concentration before the variation. This variation range of the substrate concentration is more preferably within ±20%, is furthermore preferably within ±15%, is much more preferably within ±10% and is especially preferably within ±5%.

In production of the cyclic PAS by heating and reacting the raw material mixture (a), a preferable procedure performs the reaction in the state that the water content is reduced in the raw material mixture (a). This is likely to lead to advantageous effects, for example, maintaining a low level of pressure in the reaction vessel, accelerating consumption of the monomer and shortening the time required for the reaction. More specifically, the water content in the raw material mixture (a) is preferably not greater than 5 mol and is more preferably not greater than 3 mol per 1 mol of the sulfur content in the raw material mixture (a).

Dehydration of the raw material components, for example, the sulfidizing agent and the organic polar solvent, used for preparation of the raw material mixture (a) may be performed in advance, in order to control the water content in the raw material mixture (a) to less than 0.8 mol, preferably less than 0.7 mol, furthermore preferably less than 0.6 mol and much more preferably less than 0.5 mol relative to 1 mol of the sulfur content in the raw material mixture (a). There is no lower limit of the water content in the reaction mixture, but the water content nearer to 0 mol is more preferable. The substantial lower limit may be, for example, equal to or greater than 0.05 mol per 1 mol of the sulfur content in the reaction mixture. Another advantageous effect achieved by controlling the water content to this range is tendency to suppress deposition of a colored substance in an eventually obtained reaction solution or on a reaction vessel used for the reaction. This advantageous effect preferably reduces the load of cleaning of the reaction vessel, as well as improving the quality of the resulting cyclic PAS.

A preferable method of controlling the water content in the raw material mixture (a) to the above desired range is a method of using an anhydride or a low water-content material as the above raw material component. When the total water content in the above raw material components exceeds the desired range, employed may be a method of providing a dehydration process prior to preparation of the raw material mixture (a) to reduce the water content of the respective components to the desired range or a method of mixing the above raw material components having the high water content and achieving dehydration during the reaction of the mixture. In general, with regard to the dihalogenated aromatic compound and the organic polar solvent, sufficiently low water-content materials are relatively easily available. With regard to the sulfidizing agent, for example, an alkali metal sulfide, a hydrate or an aqueous mixture including water is generally inexpensive and more easily available. Accordingly, in terms of the availability and the cost, it is preferable to use such a hydrate or aqueous mixture as the sulfidizing agent. In this application, however, even when the dihalogenated aromatic compound and the organic polar solvent have the low water content, the reaction mixture tends to have the increased water content, due to the water-containing sulfidizing agent. It is accordingly preferable to provide the dehydration process, in order to regulate the water content in the reaction mixture to the above desired range.

The dehydration method employed in this dehydration process is not specifically limited but may be any procedure of regulating the water content. For example, a deliquoring method described below may be employed preferable. This method prepares a mixture including at least an aqueous sulfidizing agent and an organic polar solvent in a temperature range of ordinary temperature to 150° C. or preferably ordinary temperature to 100° C. preferably in an inert gas atmosphere and heats the mixture to or above 150° C. or preferably to or above 170° C. under ordinary pressure or under reduced pressure to distill out water. The preferable upper limit of temperature for distilling out the above organic polar solvent and water is 250° C. The amount of the organic polar solvent used for the above deliquoring method is preferably not less than 0.1 liters, is more preferably not less than 0.15 liters and is furthermore preferably not less than 0.2 liters per 1 mol of the sulfur content of the sulfidizing agent. The amount of the organic polar solvent is preferably not greater than 1 liter, is more preferably not greater than 0.8 liters and is furthermore preferably not greater than 0.6 liters per 1 mol of the sulfur content of the sulfidizing agent. Controlling the amount of the organic polar solvent to this range is likely to decrease metal elution from a metal container used for the reaction and is likely to reduce the metal impurity in the resulting cyclic PAS. For the purpose of accelerating distillation, the dehydration process may perform distillation with stirring, more preferably may perform distillation with a flow of an inert gas, or may perform distillation with addition of an azeotropic component such as toluene. In another example, an apparatus used for the above deliquoring method may be provided with a rectifying column, for the purpose of selectively distilling out water.

The dehydrated component prepared by the above dehydration process is the sulfidizing agent having the low percentage of water content. Mixing this sulfidizing agent with the other components required for preparation of the raw material mixture (a), i.e., at least the dihalogenated aromatic compound and the organic polar solvent, prepares the raw material mixture (a) having the low water content for the reaction.

According to the embodiment of the invention, as described above, the raw material mixture (a) may include a linear polyarylene sulfide as a raw material component. In this application, the content of the linear polyarylene sulfide in the raw material mixture (a) is not specifically limited, as long as the raw material composition of the raw material mixture (a) is within the above range. It is, however, preferable that the sulfur content derived from the linear polyarylene sulfide is more than half of the sum of the sulfur content derived from the linear polyarylene sulfide and the sulfur content derived from the sulfidizing agent, i.e., more than half of the total sulfur content in the raw material mixture (a). More specifically, the lower limit of the ratio of the sulfur content of the linear polyarylene sulfide in the raw material mixture (a) is preferably not less than 0.5 mol, is more preferably not less than 0.6 mol and is furthermore preferably not less than 0.7 mol per 1 mol of the total sulfur content in the raw material mixture (a). The upper limit is preferably not greater than 0.99 mol, is more preferably not greater than 0.95 mol and is furthermore preferably not greater than 0.90 mol. Controlling the content of the linear polyarylene sulfide to the above desired range is likely to increase the formation rate of the cyclic polyarylene sulfide in the reaction mixture (b) described later relative to the sulfidizing agent in the raw material mixture (a). It is economically efficient to use the linear polyarylene sulfide produced as byproduct by the method according to the embodiment of the invention as the linear polyarylene sulfide of the raw material mixture (a).

The property of the resulting raw material mixture (a) is varied according to, for example, the types of the sulfidizing agent, the dihalogenated aromatic compound and the organic polar solvent used, the presence or the absence of the linear PAS and the above third component and their composition ratio and is thus not unequivocally determinable. The property of the raw material mixture (a) is, however, often a solution or a slurry. The slurry herein denotes a fluid in which solid particles are suspended in a liquid.

(6-3) Reaction Mixture (b)

In the production method of the cyclic PAS according to the embodiment of the invention, the reaction mixture (b) denotes a reaction mixture in a reaction vessel that includes at least a cyclic PAS, a linear PAS, a metal halide and an organic polar solvent and is obtained by heating and reacting the above raw material mixture (a). The method according to the embodiment of the invention continually adds the raw material mixture (a) to the reaction mixture (b) for the reaction, so that the reaction mixture (b) is allowed to include the sulfidizing agent and/or the dihalogenated aromatic compound. The substrate concentration of the reaction mixture (b) is kept constant as described above. The component composition of the reaction mixture (b) may, however, be varied and may not be always constant.

Production of the cyclic PAS according to the embodiment of the invention is characterized by continually performing the operation (A) of supplying the raw material mixture (a) to the reaction vessel including the above reaction mixture (b) and the operation (B) of withdrawing part of the reaction mixture (b) from the reaction vessel as described later. The reaction mixture (b) is present in the reaction vessel consistently including the start point of production of the cyclic PAS by the method according to the embodiment of the invention. Accordingly, the start point of production of the cyclic PAS according to the embodiment of the invention denotes the time point when the reaction mixture (b) is prepared in the reaction vessel.

The reaction mixture (b) at the start point of production (hereinafter may be referred to as initial reaction mixture) is not specifically limited as long as the reaction mixture (b) is obtained from the raw material mixture (a). The concentration of the unreacted sulfidizing agent in the initial reaction mixture is preferably not higher than 30%, is more preferably not higher than 20%, is furthermore preferably not higher than 10%, is much more preferably not higher than 5% and is especially preferably not higher than 3%, relative to the concentration of the sulfidizing agent in the raw material mixture (a). When the initial reaction mixture is obtained by fully consuming the sulfidizing agent in the raw material mixture (a), the concentration of the unreacted sulfidizing agent in the initial reaction mixture becomes 0% which is the ideal state, relative to the concentration of the sulfidizing agent in the raw material mixture (a). The lower limit in the actual reaction is, however, often equal to or greater than 0.1%. According to the embodiment of the invention, the concentration of the unreacted sulfidizing agent is shown by the mole number of the unreacted sulfidizing agent included in 1 kilogram of the reaction mixture or the like (the raw material mixture (a), the initial reaction mixture or the reaction mixture (b)). According to the embodiment of the invention, the concentration of the unreacted dihalogenated aromatic compound described later is shown by the mole number of the unreacted dihalogenated aromatic compound included in 1 kilogram of the reaction mixture or the like.

Additionally, with regard to the concentration of the unreacted sulfidizing agent in the initial reaction mixture, the sulfur content of the unreacted sulfidizing agent included in 1 kilogram of the initial reaction mixture is preferably not greater than 0.15 mol, is more preferably not greater than 0.10 mol, is furthermore preferably not greater than 0.05 mol, is much more preferably not greater than 0.025 mol and is especially preferably not greater than 0.015 mol. With regard to the concentration of the unreacted dihalogenated aromatic compound in the initial reaction mixture, the arylene unit of the unreacted dihalogenated aromatic compound included in 1 kilogram of the initial reaction mixture is preferably not greater than 0.15 mol, is more preferably not greater than 0.10 mol, is furthermore preferably not greater than 0.05 mol, is much more preferably not greater than 0.025 mol and is especially preferably not greater than 0.015 mol. Controlling the concentrations of the unreacted sulfidizing agent and the unreacted dihalogenated aromatic compound in the initial reaction mixture to the above ranges is likely to increase and stabilize the formation rate of the cyclic PAS in the reaction mixture (b).

The initial reaction mixture at the start point of production may be obtained by, for example, (b-1) heating and reacting the raw material mixture (a) in a container different from a reaction vessel used in the production method of the cyclic PAS according to the embodiment of the invention and subsequently transferring the resulting mixture to the reaction vessel, (b-2) supplying the raw material mixture (a) to a reaction vessel in advance and heating and reacting the raw material mixture (a) in batch system or (b-3) performing in parallel an operation of introducing in advance at least the organic polar solvent to a reaction vessel and supplying the raw material mixture (a) to the reaction vessel and an operation of withdrawing part of the reaction mixture from the reaction vessel until the substrate concentration is maintained in the above range of constant level. Among them, the above procedures (b-1) and (b-2) are preferable, and the procedure (b-2) is more preferable. The procedure (b-2) is industrially efficient and is thus an especially preferable method, since the procedure (b-2) does not need to separately provide a reaction vessel or transfer the resulting mixture to the reaction vessel and is likely to obtain the initial reaction mixture in a significantly shorter time period compared with the procedure (b-3).

(6-4) Operations (A) and (B)

Production of the cyclic PAS according to the embodiment of the invention continually performs each of an operation (A) of supplying the raw material mixture (a) to the reaction vessel including a reaction mixture (b) produced from the above raw material mixture (a), an operation (B) of withdrawing part of the reaction mixture (b) from the reaction vessel, and an operation (C) of heating the reaction vessel. Any method may be employed for the operations (A) and (B) as long as the method continually produces the reaction mixture (b). Herein continually performing includes not only the configuration of continuously performing these operations but the configuration of intermittently performing at least one of the operations, for example, the configuration of alternately and consecutively performing these operations.

According to a preferable embodiment of the invention, the method of supplementarily adding the raw material mixture (a) to the reaction mixture (b) produced from the above raw material mixture (a) while maintaining a constant level of substrate concentration under a specified condition has the advantageous effect of enhancing the formation rate of the cyclic PAS. This may be attributed to that maintaining the high reaction temperature without a temperature rise operation is advantageous for the cyclization selectivity. On the other hand, a method of simply supplementarily adding the raw material mixture (a) increases the total amount of the reaction mixture (b) by the supplementary addition and needs to terminate the reaction within the capacity of the reaction vessel and accordingly has a problem in improvement of the productivity. As a measure to solve this problem, the inventors have thought of an idea that an operation (A) of supplementarily adding or supplying the raw material mixture (a) and an operation (B) of withdrawing the reaction mixture (B) are respectively performed continually to regulate the volume of the reaction mixture (b) to or below the capacity of the reaction vessel and, as a result of intensive studies, have completed the invention by finding a method of high productivity that continually produces the reaction mixture (b) while providing the effect of enhancing the formation rate of the cyclic PAS in one reaction vessel.

A method of producing the cyclic PAS by simply heating and reacting the raw material mixture (a) in batch system without performing the above operations (A) and (B) has the lower formation rate of the cyclic PAS than the method of the invention and additionally requires the time for a temperature rise operation every time the raw material mixture (a) is supplied and is reacted. This leads to decreasing the productivity of the cyclic PAS. A method that performs only the above operation (A) but does not perform the above operation (B) improves the formation rate of the cyclic PAS as described previously but decreases the productivity of the cyclic PAS, due to the limitation by the capacity of the reaction vessel. Continually performing each of the operations (A) and (B) is thus of great importance, in order to produce the cyclic PAS with the high formation rate and the high productivity.

The method of continually performing the operation (A) and the operation (B) according to the embodiment of the invention may be, for example, a method of alternately performing the respective operations at different timings or a method of simultaneously performing the respective operations. Another available method may include a period of performing neither of the operations, a period of performing both the operations and a period of performing only one of the operations. The method of simultaneously performing the respective operations is, however, preferable in terms of improving the productivity of the cyclic PAS by keeping the amount of the reaction mixture (b) in the reaction vessel constant at a level close to a maximum permissible level based on the capacity of the reaction vessel. The method of continually performing the operation (A) and the operation (B) may be, for example, a method of intermittently performing each of the operations, a method of continuously performing each of the operations or a method of intermittently performing one of the operations and continuously performing the other of the operations. The method of continuously performing each of the operations is, however, preferable in terms of the easiness of maintaining the composition of the reaction mixture (b) in the reaction vessel and keeping the pressure in the reaction vessel constant and thereby continually producing the cyclic PAS of constant quality. For example, a method of simultaneously and continuously performing the operations (A) and (B) is preferably employed. This method is more likely to continually produce the cyclic PAS of constant quality with the high productivity.

In production of the cyclic PAS according to the embodiment of the invention, the amount of the reaction mixture (b) in the reaction vessel is not specifically limited but may be kept constant or may be varied, as long as the reaction mixture (b) is present in the reaction vessel and has the amount maintained at a level of not greater than the capacity of the reaction vessel. It is, however, preferable that the amount of the reaction mixture (b) is kept constant, since keeping the amount of the reaction mixture (b) constant at a level close to the maximum permissible level based on the capacity of the reaction vessel improves the productivity of the cyclic PAS. In the description herein, "keeping the amount of the reaction mixture (b) in the reaction vessel constant" means that the variation range of the amount of the reaction mixture (b) in the reaction vessel is within ±30% relative to the amount of the reaction mixture (b) before the variation. This variation range is more preferably within ±20%, is furthermore preferably within ±15%, is much more preferably within ±10% and is especially preferably within ±5%.

The supplied amount of the raw material mixture (a) in the operation (A) and the withdrawn amount of the reaction mixture (b) in the operation (B) are not specifically limited but may be different from each other or may be equal to each other, as long as the reaction mixture (b) is present in the reaction vessel and has the amount maintained at a level of not greater than the capacity of the reaction vessel. It is, however, preferable that the supplied amount is equal to the withdrawn amount. Such setting enables the amount of the reaction mixture (b) in the reaction vessel to be kept constant and is thus preferable in terms of the productivity of the cyclic PAS as described above.

Furthermore, combining such setting with the method described above may be preferably employed. For example, a preferable method may simultaneously and continuously perform the operation (A) and the operation (B), such that the supplied amount of the raw material mixture (a) in the operation (A) is equal to the withdrawn amount of the reaction mixture (b) in the operation (B) and the amount of the reaction mixture (b) in the reaction vessel is kept constant. This method provides a continuous reaction system and maintains the constant composition of the reaction mixture (b) in the stationary state. This method is more likely to continually produce the cyclic PAS of constant quality at the high formation rate and accordingly ensures the remarkably high productivity.

The supplied amount of the raw material mixture (a) in the operation (A) is generally shown by the weight of the raw material mixture (a) placed in the reaction vessel. The supplied amount is expressed by the weight per supply in the case of intermittent supply, while being expressed by the weight per unit time in the case of continuous supply. The withdrawn amount of the reaction mixture (b) in the operation (B) is generally shown by the weight of the reaction mixture (b) withdrawn from the reaction vessel. When the reaction mixture (b) includes a component that is volatilized after withdrawal, the withdrawn amount is given as a total including the weight of such a component. The withdrawn amount is expressed by the weight per withdrawal in the case of intermittent withdrawal, while being expressed by the weight per unit time in the case of continuous withdrawal.

The supplied amount of the raw material mixture (a) in the operation (A) and the withdrawn amount of the reaction mixture (b) in the operation (B) depend on various conditions such as the capacity of the reaction vessel used, the types and the amounts of the raw materials used and the reaction temperature and are not generally specifiable. The relationship of the supplied amount and the withdrawn amount to the amount of the reaction mixture (b) in the reaction vessel may, however, be shown by an average retention time of the reaction mixture (b). Herein the average retention time is defined by [average weight of reaction mixture (b) in reaction vessel]/[supplied weight of raw material mixture (a) per unit time or withdrawn weight of reaction mixture (b) per unit time] at the point of time when the supplied amount of the raw material mixture (a) becomes equal to the withdrawn amount of the reaction mixture (b). For example, when the average weight of the reaction mixture (b) in the reaction vessel is 40 kg and the supplied weight of the raw material mixture (a) per unit time and the withdrawn weight of the reaction mixture (b) per unit time are 20 kg, the average retention time is 2 hours. In the case of intermittent supply of the raw material mixture (a) and/or intermittent withdrawal of the reaction mixture (b), the supplied weight of the raw material mixture (a) per unit time or the withdrawn weight of the reaction mixture (b) per unit time in this relational expression is calculated from a time period between start of a first supply and end of a last withdrawal and the supplied amount of the raw material mixture (a) or the withdrawn amount of the reaction mixture (b). For example, when it takes 12 hours from start of a first supply to end of a last withdrawal and the supplied amount of the raw material mixture (a) in this time period is 240 kg, the supplied weight of the raw material mixture (a) per unit time or the withdrawn weight of the reaction mixture (b) per unit time is 20 kg.

The average retention time depends on various conditions such as the types and the mounts of the raw materials used and the reaction temperature and are not generally specifiable but is preferably not less than 0.1 hours and is more preferably not less than 0.5 hours. The average retention time has, on the other hand, no specific upper limit. The reaction may, however, sufficiently proceed within 40 hours, more preferably within 10 hours or more preferably within 6 hours.

According to the embodiment of the invention, the raw material mixture (a) is supplied to the reaction vessel in the operation (A). Since the property of the raw material mixture (a) is a solution or slurry as described above, the supply may be achieved by free fall, by a pressure difference or by means of a pump.

In an application that the raw material mixture (a) is supplied by free fall, the supplied amount may be adjusted by, for example, laying a piping for supplying the raw material mixture (a) from above a reaction vessel, placing a valve between the piping and the reaction vessel, and controlling the valve opening. According to a preferable embodiment of the invention, the pressure in the reaction vessel exceeds the ordinary pressure as described later. In this case, the pressure in a container including the raw material mixture (a) and the pressure in the reaction vessel may be equalized by any known technique, so that free fall may be employed for the supply.

In an application that the raw material mixture (a) is supplied by a pressure difference, the raw material mixture (a) may be pressurized, for example, by using an inert gas such as nitrogen gas or by using a vapor pressure of the raw material mixture (a).

In an application that the raw material mixture (a) is supplied by means of a pump, it is preferable to use a commercially available pump. The pump used is not unequivocally determinable, since its suitability depends on, for example, the physical properties of the raw material mixture (a) and the supply conditions. Preferable pumps may be, for example, those classified into displacement pumps or turbopumps. Among the displacement pumps, rotary pumps are preferable, and more specifically gear pumps are preferable. Among the turbopumps, centrifugal pumps are preferable, more specifically volute pumps are preferable, and furthermore specifically canned motor pumps and magnet pumps included in the volute pumps are preferable. Among these pumps, any pump internally having a mechanical sealing structure may be used to supply even the slurry raw material mixture (a) without any difficulty. According to a preferable application of the invention, the pressure in the reaction vessel exceeds the ordinary pressure as described later. In this case, any of these pumps may be used. Using such a pump enables the raw material mixture (a) to be supplied stably, while increasing the pressure in the reaction vessel to a higher pressure than the ordinary pressure.

In any of the applications that the raw material mixture (a) is supplied by free fall, by means of a pump or by a pressure difference, when the raw material mixture (a) is slurry, it is preferable to sufficiently stir the raw material mixture (a) prior to the supply and uniformly disperse the particles, in order to enhance the uniformity during supply. In the case of supplying the slurry raw material mixture (a), it is preferable to use a pump, in terms of easiness to maintain the high level of uniformity. A preferable method employed in the application using a pump may provide a container including the raw material mixture (a) (a container connected with a reaction vessel to supply the raw material mixture (a) into the reaction vessel and also called supply container) with a circulation line via the pump, circulate the raw material mixture (a) through the container and control the valve opening of a branch line branched off from the circulation line via a valve, so as to supply any amount of the raw material mixture (a) to the reaction vessel with regulating the flow rate in the branch line. More specifically, the supply container may be provided with the circulation line that is connected with the supply container and is arranged to circulate at least part of the raw material mixture (a) to and from the supply container by using the above pump, and part of the raw material mixture (a) flowing through the circulation line may be supplied into the reaction vessel. This arrangement makes it more likely to maintain the higher level of uniformity of the slurry raw material mixture (a) in the line and provide the uniform composition of the raw material mixture (a) supplied.

The reaction mixture (b) is withdrawn from the reaction vessel in the operation (B), and withdrawal may be achieved by free fall, by a pressure difference or by means of a pump.

In an application that the reaction mixture (b) is withdrawn by free fall, the withdrawn amount may be adjusted by, for example, placing a valve at an opening of a reaction vessel and controlling the valve opening. According to a preferable embodiment of the invention, the pressure in the reaction vessel exceeds the ordinary pressure as described later. In this case, the pressure in the reaction vessel including the reaction mixture (b) and the pressure in a container to which the withdrawn reaction mixture (b) is supplied (a container to which the reaction mixture (b) withdrawn from the reaction vessel is supplied and also called receiving container) may be equalized by any known technique, so that free fall may be employed for the withdrawal.

In an application that the reaction mixture (b) is withdrawn by a pressure difference, the reaction mixture (b) may be pressurized, for example, by using an inert gas such as nitrogen gas or by using a vapor pressure of the reaction mixture (b).

In an application that the reaction mixture (b) is withdrawn by means of a pump, it is preferable to use a commercially available pump. The pump used is not unequivocally determinable, since its suitability depends on, for example, the physical properties of the reaction mixture (b) and the supply conditions. Preferable pumps may be, for example, those classified into displacement pumps or turbopumps. Among the displacement pumps, rotary pumps are preferable, and more specifically gear pumps are preferable. Among the turbopumps, centrifugal pumps are preferable, and more specifically canned motor pumps and magnet pumps included in volute pumps are preferable.

According to the embodiment of the invention, the reaction mixture (b) includes a metal halide as a byproduct, and in some combinations of a metal halide species and an organic polar solvent, the metal halide may be insoluble to precipitate, and the reaction mixture (b) may be slurry. Accordingly, in the case that the metal halide as the byproduct precipitates, it is preferable to sufficiently stir the reaction mixture (b) in the reaction vessel and uniformly disperse the particles of the metal halide, in order to enhance the uniformity of the reaction mixture (b) during withdrawal. In an application using a pump for withdrawal of the reaction mixture (b) including the precipitate of the metal halide as the byproduct, it is preferable to use a pump internally having a mechanical sealing structure, for example, a slurry sealing-type canned motor pump, among the above pumps.

According to a preferable embodiment of the invention, the pressure in the reaction vessel exceeds the ordinary pressure as described later. In this case, any of the pumps described above may be used. When the pressure in the reaction vessel exceeds the ordinary pressure and the metal halide as the byproduct precipitates as described above, it is especially preferable to use a slurry sealing-type canned motor pump. Using such a pump enables the reaction mixture (b) of the high uniformity to be stably withdrawn, while increasing the pressure in the reaction vessel to a higher pressure than the ordinary pressure.

A preferable method employed in the application using the pump described above for withdrawal of the reaction mixture (b) may provide the reaction vessel including the reaction mixture (b) with a circulation line via the pump and a branch line branched off from the circulation line via a valve and control the valve opening in the branch line, so as to withdraw any amount of the reaction mixture (b) from the reaction vessel with regulating the flow rate in the branch line. More specifically, the reaction vessel may be provided with the circulation line that is connected with the reaction vessel and is arranged to circulate at least part of the reaction mixture (b) to and from the reaction vessel by using the above pump, and part of the reaction mixture (b) flowing through the circulation line may be supplied into the reaction vessel. This arrangement makes it more likely to maintain the higher level of uniformity of the slurry reaction mixture (b) including the precipitate component such as the metal halide in the line and increase the uniformity during withdrawal.

In the embodiment of the invention, it is also preferable to link the reaction vessel with the supply container of the raw material mixture and/or the receiving container to which the withdrawn reaction mixture (b) is supplied by a pressure equalizing line and equalize their pressures. The pressure equalizing line denotes a gas flow path arranged to link respective containers with each other and thereby equally control the pressures in the respective containers. The pressure equalizing line does not substantially allow for the flow of the mixture between the respective containers. This eases transfer of the mixture between the respective containers and facilitates the control of the operation (A) and the operation (B). Any known method may be applied to link the respective containers with each other. In order to maintain a constant level of substrate concentration during reaction and maintain the formation rate of the cyclic polyarylene sulfide at a high level, it is preferable to set such equipment configuration and operation conditions as to interfere with transfer of the individual components of the raw material mixture (a) and/or the reaction mixture (b) between the linked containers.

As described above, the reaction mixture (b) withdrawn from the reaction vessel may be transferred through the piping to a receiving container as a separate container and recovered. An operation (D) of further heating the reaction mixture (b) may be performed in the receiving container as described later to provide a reaction mixture (c).

(6-5) Other Embodiments

According to the embodiment of the invention, the concentration of the unreacted sulfidizing agent in the reaction mixture (b) may be varied by the above operation (A) and operation (B). The concentration of the unreacted sulfidizing agent in the reaction mixture (b) is, however, preferably maintained consistently to or below 30%, is more preferably maintained to or below 20%, is furthermore preferably maintained to or below 10%, is much more preferably maintained to or below 5% and is especially preferably maintained to or below 3%, relative to the concentration of the sulfidizing agent in the raw material mixture (a). When the sulfidizing agent in the reaction mixture (b) is fully consumed, the concentration of the unreacted sulfidizing agent becomes 0% which is the ideal state, relative to the concentration of the sulfidizing agent in the raw material mixture (a). The lower limit in the actual reaction is, however, often equal to or greater than 0.1%.

According to the embodiment of the invention, the concentration of the unreacted dihalogenated aromatic compound in the reaction mixture (b) may be varied by the above operation (A) and operation (B). The concentration of the unreacted dihalogenated aromatic compound in the reaction mixture (b) is, however, preferably maintained consistently to or below 30%, is more preferably maintained to or below 20%, is furthermore preferably maintained to or below 10%, is much more preferably maintained to or below 5% and is especially preferably maintained to or below 3%, relative to the concentration of the dihalogenated aromatic compound in the raw material mixture (a). When the dihalogenated aromatic compound in the reaction mixture (b) is fully consumed, the concentration of the unreacted dihalogenated aromatic compound becomes 0% which is the ideal state, relative to the concentration of the sulfidizing agent in the raw material mixture (a). The lower limit in the actual reaction is, however, often equal to or greater than 0.1%.

In addition to the above, with regard to the concentration of the unreacted sulfidizing agent in the reaction mixture (b), the sulfur content of the unreacted sulfidizing agent included in 1 kilogram of the reaction mixture (b) is preferably not greater than 0.15 mol, is more preferably not greater than 0.10 mol, is furthermore preferably not greater than 0.05 mol, is much more preferably not greater than 0.025 mol and is especially preferably not greater than 0.015 mol. With regard to the concentration of the unreacted dihalogenated aromatic compound in the reaction mixture (b), the arylene unit of the unreacted dihalogenated aromatic compound included in 1 kilogram of the reaction mixture (b) is preferably not greater than 0.15 mol, is more preferably not greater than 0.10 mol, is furthermore preferably not greater than 0.05 mol, is much more preferably not greater than 0.025 mol and is especially preferably not greater than 0.015 mol. Controlling the concentrations of the unreacted sulfidizing agent and the unreacted dihalogenated aromatic compound in the reaction mixture (b) to the above ranges is likely to increase and stabilize the formation rate of the cyclic PAS in the reaction mixture (b).

The concentrations of the unreacted sulfidizing agent and the unreacted dihalogenated aromatic compound in the reaction mixture (b) may be varied by the operation (A) and the operation (B) as described above but may be maintained in the above desirable ranges by regulating their methods and controls. According to a preferable embodiment of the invention, an employed method of simultaneously and continuously performing the operation (A) and the operation (B), such that the supplied amount of the raw material mixture (a) in the operation (A) is equal to the withdrawn amount of the reaction mixture (b) in the operation (B) and the amount of the reaction mixture (b) in the reaction vessel is kept constant, enables the concentrations of the unreacted sulfidizing agent and the unreacted dihalogenated aromatic compound in the reaction mixture (b) to be kept constant in the steady state. In this application, a method employed to maintain the concentrations of the unreacted sulfidizing agent and the unreacted dihalogenated aromatic compound in the reaction mixture (b) in the above desirable ranges may be a method of regulating the supplied amount of the raw material mixture (a) in the operation (A) and the withdrawn amount of the reaction mixture (b) in the operation (B).

As described above, controlling the concentrations of the unreacted sulfidizing agent in the reaction mixture (b) to be not higher than 30% of the concentration of the sulfidizing agent in the raw material mixture (a) and controlling the concentration of the unreacted dihalogenated aromatic compound in the reaction mixture (b) to be not higher than 30% of the concentration of the dihalogenated aromatic compound in the raw material mixture (a), and maintaining the sulfur content of the unreacted sulfidizing agent and the arylene unit of the unreacted dihalogenated aromatic compound included in 1 kilogram of the reaction mixture (b) to be not greater than 0.15 mol is more likely to improve the formation rate of the cyclic PAS in the reaction mixture (b). This may be attributed to that maintaining a low level of monomer concentration provides a pseudo-distillation condition and thereby improves the selectivity of the cyclization reaction.

In the method according to the embodiment of the invention, the concentration of the sulfidizing agent in the reaction mixture may be calculated by quantitatively determining the amount of the sulfidizing agent in the reaction mixture by, for example, ion chromatography in combination with an electrical conductivity detector or an electrochemical detector. A specific procedure of evaluation by ion chromatography may add a hydrogen peroxide solution to a sample to oxidize the sulfide ion included in the sample, calculate the amount of sulfate ion generated by oxidation of the sulfide ion by analysis using the electrical conductivity detector, and subsequently calculate the concentration of the sulfidizing agent in the reaction mixture from the calculated amount of sulfate ion. In the method according to the embodiment of the invention, the concentration of the dihalogenated aromatic compound in the reaction mixture may be calculated by quantitatively determining the amount of the dihalogenated aromatic compound in the reaction mixture by, for example, gas chromatography.

The method of producing the cyclic PAS according to the embodiment of the invention may additionally include an operation (D) of further heating the withdrawn reaction mixture (b), so as to obtain a reaction mixture (c). The reaction condition of the operation (D) is not specifically limited but is preferably a reaction condition that enables the unreacted raw materials to be substantially fully consumed, since this operation aims to consume the unreacted raw materials included in the withdrawn reaction mixture (b). For example, the reaction condition may be preferably continuing heating for 0.1 hours to 10 hours or more preferably continuing heating for 0.1 hours to 3 hours. In another example, the reaction condition may increasing the heating temperature in a desirable range described below.

The method of producing the cyclic PAS according to the embodiment of the invention supplies the raw material mixture (a) into the reaction vessel including the reaction mixture (b) (operation (A)) and heats the reaction vessel (operation (C)) to make the reaction proceed as described above. The temperature during this reaction is desirably a temperature exceeding the reflux temperature of the reaction mixture (b) under ordinary pressure. This desirable temperature may be varied according to the types and the amounts of the sulfidizing agent, the dihalogenated aromatic compound and the organic polar solvent used for the reaction and is thus not unequivocally determinable. This temperature is, however, generally not lower than 120° C., is preferably not lower than 180° C., is more preferably not lower than 220° C., and is furthermore preferably not lower than 225° C. This temperature is also generally not higher than 350° C., is preferably not higher than 320° C., is more preferably not higher than 310° C. and is furthermore preferably not higher than 300° C. In this preferable temperature range, the sulfidizing agent and the dihalogenated aromatic compound which are the raw material components are likely to be quickly consumed for the reaction to produce the cyclic PAS and the linear PAS. The reaction is thus likely to proceed in a short time period. The ordinary pressure herein denotes a pressure close to the standard atmospheric conditions. The standard atmospheric conditions mean the atmospheric conditions of temperature of approximately 25° C. and absolute pressure of approximately 101 kPa. The reflux temperature herein denotes a temperature in such a state that the liquid component of the reaction mixture repeats vaporization and condensation. According to the embodiment of the invention, as described above, it is preferable to heat the reaction mixture (b) at the temperature exceeding the reflux temperature under ordinary pressure. A method employed to keep the reaction vessel in such heating conditions may be, for example, a method setting the internal pressure of the reaction vessel to a pressure exceeding the ordinary pressure or a method of using an airtight container for the reaction vessel.

In production of the cyclic PAS according to the embodiment of the invention, the pressure in the reaction vessel including the reaction mixture (b) is not specifically limited. The pressure may be varied according to, for example, the raw materials of the reaction mixture in the reaction vessel, the composition of the reaction mixture and the reaction temperature and is thus not unequivocally determinable. The lower limit of the pressure is preferably not lower than 0.05 MPa in gauge pressure and is more preferably not lower than 0.3 MPa. At the preferable reaction temperature according to the embodiment of the invention, the pressure is increased by own pressure of the reactant. The lower limit of the pressure at such reaction temperature is preferably not lower than 0.25 MPa and is more preferably not lower than 0.3 MPa. The upper limit of the pressure is preferably not higher than 10 MPa and is more preferably not higher than 5 MPa. This preferable pressure range is likely to shorten the time required for the exposure and reaction of the linear polyarylene sulfide, the sulfidizing agent and the dihalogenated aromatic compound. A preferable method may pressurize the reaction vessel using an inert gas such as nitrogen, helium or argon, in order to control the pressure during heating of the reaction mixture in the reaction vessel to the above preferable pressure range. The withdrawn reaction mixture (b) may be transferred through piping to a separate container and recovered. In this application, for the purpose of minimizing a change in composition and the conditions of the reaction mixture (b), an available method may adjust the pressure difference between the reaction vessel and the separate container. The gauge pressure herein denotes a relative pressure to the atmospheric pressure and is synchronous with a pressure difference by subtracting the atmospheric pressure from the absolute pressure.

(7) Method of Recovering Cyclic Polyarylene Sulfide

In production of the cyclic PAS according to the embodiment of the invention, the cyclic PAS may be separated and recovered from the reaction mixture obtained by the reaction described above. The reaction mixture obtained by the reaction includes the cyclic PAS, the linear PAS and the organic polar solvent and may additionally include the unreacted sulfidizing agent, the unreacted dihalogenated aromatic compound, water and a byproduct salt as other components.

(7-1) Recovery Method 1 of Cyclic Polyarylene Sulfide

The method employed to recover the PAS component from such a reaction mixture is not specifically limited but may be, for example, a method of removing some part or most part of the organic polar solvent from the reaction mixture by distillation or another operation as appropriate and subsequently exposing the reaction mixture, with heating as appropriate, to a solvent that has low solubility to the PAS component, is miscible with the organic polar solvent and preferably has solubility to the byproduct salt, so as to recover the PAS component as a solid mixture of the cyclic PAS and the linear PAS. Another available method may separate a solid component and a soluble component in the reaction mixture from each other by solid-liquid separation at a temperature that allows for dissolution of the cyclic PAS and the linear PAS included in the reaction mixture, preferably a temperature exceeding 200° C. or more preferably a temperature exceeding 230° C. to recover a solution component including at least the cyclic PAS, the linear PAS and the organic polar solvent, remove some part or most part of the organic polar solvent from this solution component by distillation or another operation as appropriate and subsequently expose the solution component, with heating as appropriate, to a solvent that has low solubility to the PAS component, is miscible with the organic polar solvent and preferably has solubility to the byproduct salt, so as to recover the PAS component as a solid mixture of the cyclic PAS and the linear PAS. The solvent that has low solubility to the PAS component, is miscible with the organic polar solvent and preferably has solubility to the byproduct salt is generally a solvent having relatively high polarity. The preferable solvent differs according to the type of the organic polar solvent used and the type of the byproduct salt and is thus not restricted. Available examples of the solvent include water, alcohols such as methanol, ethanol, propanol, isopropyl alcohol, butanol and hexanol, ketones such as acetone and acetates such as ethyl acetate and butyl acetate. In terms of the availability and the economic efficiency, water, methanol and acetone are preferable, and water is especially preferable.

Such treatment using the solvent can reduce the amount of the organic polar solvent and the amount of the byproduct salt contained in the solid mixture of the cyclic PAS and the linear PAS. This treatment causes both the cyclic PAS and the linear PAS to precipitate as the solid component, so that the PAS component may be recovered as the mixture of the cyclic PAS and the linear PAS by a known solid-liquid separation technique. The solid-liquid separation technique may be, for example, separation by filtration, centrifugal separation or decantation. The above series of treatment may be repeated several times as appropriate. This is likely to further reduce the amount of the organic polar solvent and the amount of the byproduct salt contained in the solid mixture of the cyclic PAS and the linear PAS.

A method employed for the above treatment using the solvent may be a method of mixing the solvent with the reaction mixture with appropriately stirring or heating as necessary. The temperature of the treatment using the solvent is not specifically limited but is preferably not lower than 20° C. and is more preferably not lower than 50° C. The temperature is also preferably not higher than 220° C. and is more preferably not higher than 200° C. This temperature range facilitates removal of, for example, the byproduct salt and preferably allows for treatment in a relatively low pressure condition. In an application using water as the solvent, the water is preferably distilled water or deionized water. The solvent may be an aqueous solution appropriately including a compound selected from the group consisting of organic acidic compounds such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid and fumaric acid and their alkali metal salts and alkaline earth metal salts, inorganic acidic compounds such as sulfuric acid, phosphoric acid, hydrochloric acid, carbonic acid and silicic acid and ammonium ion. When the solid mixture of the cyclic PAS and the linear PAS obtained by the above treatment contains the solvent used for the treatment may be subjected to a required operation such as drying for removal of the solvent.

The recovery method described above recovers the cyclic PAS in the form of a mixture of the cyclic PAS and the linear PAS (hereinafter may be referred to as PAS mixture). The method employed to separate the cyclic PAS from the linear PAS may be, for example, a separation method using the difference in solubility between the cyclic PAS and the linear PAS or more specifically a method of exposing the PAS mixture, with heating as appropriate, to a solvent that has high solubility to the cyclic PAS but poor solubility to the linear PAS under the condition of dissolving the cyclic PAS, so as to obtain the cyclic PAS as a solvent-soluble component. In order to obtain the cyclic PAS with high efficiency by the above separation method using the solubility, the molecular weight of the linear PAS is preferably a molecular weight that is unlikely to be dissolved or preferably is substantially insoluble in a solvent that is capable of dissolving the cyclic PAS as described later. More specifically, the molecular weight of the linear PAS may be not less than 2,500 as the weight-average molecular weight, is preferably not less than 5,000 and is more preferably not less than 10,000.

The solvent used for separation between the cyclic PAS and the linear PAS is not specifically limited but may be any solvent that is capable of dissolving the cyclic PAS. In the environment of such dissolution, the solvent is preferably a solvent that dissolves the cyclic PAS but is unlikely to dissolve the linear PAS or more preferably a solvent that does not substantially dissolve the linear PAS. The pressure in the reaction system that exposes the PAS mixture to the above solvent is preferably ordinary pressure or slightly increased pressure and is especially preferably ordinary pressure. The reaction system in such pressure has the advantage that members constituting a reactor are inexpensive. From this point of view, it is preferable to avoid a pressurizing condition that needs an expensive pressurized vessel as the pressure in the reaction system. The solvent used is preferably a solvent that does not substantially cause any undesirable side reaction such as degradation or cross-linking of the PAS component. Examples of the preferable solvent for the operation of exposing the PAS mixture to the solvent under a reflux condition at ordinary pressure include hydrocarbon solvents such as pentane, hexane, heptane, octane, cyclohexane, cyclopentane, benzene, toluene and xylene; halogenated solvents such as chloroform, bromoform, methylene chloride, 1,2-dichloroethane, 1,1,1-trichloroethane, chlorobenzene and 2,6-dichlorotoluene; ether solvents such as diethyl ether, tetrahydrofuran and diisopropyl ether; and polar solvents such as N,N-dimethylformamide, N,N-dimethylacetamide, dimethyl sulfoxide, trimethylphosphoric acid, N,N-dimethylimidazolidinone, and methyl ethyl ketone. Among them, preferable are benzene, toluene, xylene, chloroform, bromoform, methylene chloride, 1,2-dichloroethane, 1,1,1-trichloroethane, chlorobenzene, 2,6-dichlorotoluene, diethyl ether, tetrahydrofuran, diisopropyl ether, N,N-dimethylformamide, N,N-dimethylacetamide, dimethyl sulfoxide, trimethylphosphoric acid, N,N-dimethylimidazolidinone, and methyl ethyl ketone. More preferable are toluene, xylene, chloroform, methylene chloride, tetrahydrofuran and methyl ethyl ketone.

The atmosphere for exposure of the PAS mixture to the solvent is not specifically limited but is preferably a non-oxidizing atmosphere in the case that the PAS component or the solvent is subjected to oxidative degradation under some conditions of temperature and time for the exposure. The non-oxidizing atmosphere denotes an atmosphere having an oxygen concentration in the gas phase of not higher than 5% by volume or preferably not higher than 2% by volume and is more preferably an atmosphere that does not substantially contain oxygen or more specifically an inert gas atmosphere such as nitrogen, helium or argon. Among them, nitrogen atmosphere is preferable, due to its economic efficiency and easiness of handling.

The temperature for exposure of the PAS mixture to the solvent is not specifically limited. In general, the higher temperature is more likely to accelerate dissolution of the cyclic PAS in the solvent. With regard to the linear PAS having a low molecular weight, the higher temperature is also more likely to accelerate dissolution of the linear PAS. When the molecular weight of the linear PAS is in the desirable molecular weight range described above, however, due to a large difference in solubility from the cyclic PAS, exposing the PAS mixture to the solvent even at high temperature is likely to favorably separate the cyclic PAS from the linear PAS. As described above, it is preferable to expose the PAS mixture to the solvent under the atmospheric pressure, so that the upper limit temperature is preferably a reflux temperature of the solvent used under the atmospheric pressure. In an application using the preferable solvent described above, a specific temperature range for exposure of the PAS mixture to the solvent is, for example, not lower than 20° C. and is preferably not lower than 30° C. The temperature range is also, for example, not higher than 150° C. and is preferably not higher than 100° C.

The time for exposure of the PAS mixture to the solvent differs according to, for example, the solvent species used and the temperature and is thus not unequivocally determinable. The time may be, however, for example, 1 minute to 50 hours. The time in this range is likely to sufficiently dissolve the cyclic PAS into the solvent.

The method employed to expose the PAS mixture to the solvent is not specifically limited but may be any known general technique, for example, a method of mixing the PAS mixture with the solvent and recovering a solution moiety after stirring as appropriate, a method of spraying the solvent onto the PAS mixture placed on any of various filters to simultaneously dissolve the cyclic PAS in the solvent, or a method based on the principle of Soxhlet extraction. The amount of the solvent used for exposure of the PAS mixture to the solvent is not specifically limited but may be, for example, in a range of 0.5 to 100 as a liquor ratio to the weight of the PAS mixture. The liquor ratio in this range is likely to uniformly mix the PAS mixture with the solvent and sufficiently dissolve the cyclic PAS in the solvent. In general, the higher liquor ratio is more advantageous for dissolution of the cyclic PAS in the solvent. The excessively high liquor ratio, however, does not provide any enhanced effect but may lead to an economic disadvantage by increasing the amount of the solvent used. In an application that repeatedly exposes the PAS mixture to the solvent, even the low liquor ratio is likely to have the sufficient effect. The Soxhlet extraction has, in principle, the effect similar to that of the repeated exposure of the PAS mixture to the solvent and is thus likely to have the sufficient effect at the low liquor ratio.

When a solution in which the cyclic PAS is dissolved is obtained after exposure of the PAS mixture to the solvent in the form of solid-liquid slurry including the solid linear PAS, it is preferable to recover a solution moiety by a known solid-liquid separation technique. The solid-liquid separation technique may be, for example, separation by filtration, centrifugal separation or decantation. The cyclic PAS can be recovered by removing the solvent from the solution separated by such a technique. When the cyclic PAS still remains in a solid component, repeating the exposure to the solvent and the recovery of the solution moiety may increase the yield of the cyclic PAS. When the cyclic PAS hardly remains in the solid component, removal of the remaining solvent may provide high-purity linear PAS which is favorably recyclable.

The cyclic PAS may be obtained as a solid component by removing the solvent from the cyclic PAS-including solution obtained as described above. The method employed for removal of the solvent may be, for example, a method of heating the above solution at ordinary pressure or reduced pressure or a method of using a membrane for removal of the solvent. In order to obtain the cyclic polyarylene sulfide at the higher yield and the higher efficiency, a preferable method removes the solvent by heating the above solution at ordinary pressure or reduced pressure. The cyclic PAS-including solution obtained as described above may include a solid substance at some temperature. This solid substance is also included in the cyclic polyarylene sulfide mixture and is thus preferably recovered with a component soluble in the solvent in the course of removal of the solvent. This enables the cyclic PAS to be obtained at the high yield. Removal of the solvent removes at least 50% by weight or more of the solvent, preferably 70% by weight or more of the solvent, more preferably 90% by weight or more of the solvent and furthermore preferably 95% by weight or more of the solvent. The temperature for removal of the solvent by heating depends on the properties of the solvent used and is thus not unequivocally determinable. The temperature is, however, generally not lower than 20° C. and is preferably not lower than 40° C. The temperature is also generally not higher than 150° C. and is preferably not higher than 120° C. The pressure for removal of the solvent is preferably ordinary pressure or reduced pressure, which allows for removal of the solvent at lower temperature.

(7-2) Recovery Method 2 of Cyclic Polyarylene Sulfide

The foregoing describes the method of obtaining the PAS mixture including the cyclic PAS and the linear PAS and subsequently recovering the cyclic PAS from this mixture, as the recovery method of the cyclic PAS. The recovery method is, however, not limited to this embodiment. The following describes another specific method as the recovery method of the cyclic PAS.

The reaction mixture obtained according to the embodiment of the invention includes the cyclic PAS, the linear PAS and the organic polar solvent and may additionally include the unreacted sulfidizing agent, the unreacted dihalogenated aromatic compound, water and the byproduct salt as other components, as described above. In this reaction mixture, the cyclic PAS is likely to be dissolved in the organic polar solvent in a wide temperature range. The linear PAS has, on the other hand, significantly different dissolution behavior from that of the cyclic PAS and is more specifically likely to be present mostly in the solid form in the reaction mixture in a temperature range of not lower than 200° C.

By taking advantage of such a difference in dissolution behavior in the reaction mixture between the cyclic PAS and the linear PAS, the cyclic PAS can be separated from the linear PAS by simple solid-liquid separation. The upper limit of the specific temperature range that allows for separation of the cyclic PAS from the linear PAS by solid-liquid separation is not higher than 200° C., is more preferably not higher than 150° C. and is furthermore preferably not higher than 120° C. The lower limit temperature is, on the other hand, not lower than 10° C., is preferably not lower than 20° C., is more preferably not lower than 50° C. and is furthermore preferably not lower than 80° C. In the temperature range of not higher than this preferable upper limit temperature, the linear PAS included in the reaction mixture is likely to be present in the form of a solid substance, and especially the linear PAS having the desired weight-average molecular weight described above is more likely to be present in the form of a solid substance under this condition. In this desirable temperature range, the cyclic PAS in the reaction mixture is, on the other hand, likely to be soluble in the organic polar solvent, and especially the cyclic PAS having the number m of repeating units in the desirable range described above is more likely to be dissolved in the organic polar solvent under this condition. In the temperature range of not lower than the specified lower limit temperature, on the other hand, the reaction mixture is likely to have low viscosity. This is likely to facilitate the operation of solid-liquid separation and provide the excellent separation performance of the solid component from the solution component.

The solution component obtained by solid-liquid separation of the reaction mixture described above, i.e., a filtrate component (which may include a solid component at some temperature), includes the cyclic PAS. Removing the organic polar solvent from the filtrate component allows for recovery of a solid substance including the cyclic PAS. The method employed for removal of the organic polar solvent may be, for example, a method of removal by distillation or a method of exposing the filtrate component to a second solvent that is miscible with the organic polar solvent. A specific procedure of removal by distillation may heat the filtrate component preferably to 20 to 250° C., more preferably to 40 to 200° C., furthermore preferably to 100 to 200° C. and much more preferably to 120 to 200° C. Heating the filtrate component under reduced pressure or with an air stream and additionally with stirring ensures the efficient removal of the organic polar solvent. The atmosphere for heating is preferably a non-oxidizing atmosphere, which is likely to suppress, for example, degradation, coloring and crosslinking of the cyclic PAS. The non-oxidizing atmosphere herein denotes an atmosphere having an oxygen concentration in the gas phase of not higher than 5% by volume or preferably not higher than 2% by volume and is more preferably an atmosphere that does not substantially contain oxygen or more specifically an inert gas atmosphere such as nitrogen, helium or argon. Among them, nitrogen atmosphere is preferable, due to its economic efficiency and easiness of handling. A specific procedure of substituting the solvent of the filtrate component with the second solvent to obtain the cyclic PAS may expose the filtrate component to a second solvent that does not substantially dissolve the cyclic PAS or is unlikely to dissolve the cyclic PAS, so as to recover a solid component including the cyclic PAS. A method described in the following section (8) may be employed as a more specific procedure of exposing the filtrate component to the second solvent.

(8) Other Post Treatment

The cyclic polyarylene sulfide obtained as described above has sufficiently high purity and is favorably used in various applications. Additionally performing post treatment described below may produce the cyclic PAS of the higher purity.

The cyclic PAS obtained by the series of operations described in the foregoing section (7) may include an impurity component which is included in the PAS mixture, according to the properties of the solvent used. In many cases, the impurity component may be removed selectively by exposing the cyclic PAS including a small amount of impurity to a second solvent that dissolves the impurity but does not substantially dissolve the cyclic PAS or is unlikely to dissolve the cyclic PAS. The filtrate component may be exposed to this second solvent, in order to separate the cyclic PAS as a solid component from the filtrate component (solution including the cyclic PAS) obtained by the method (7-2) described above.

The pressure in the reaction system that exposes the cyclic PAS mixture or the filtrate component obtained by the above method (7-2) to the second solvent is preferably ordinary pressure or slightly increased pressure and is especially preferably ordinary pressure. The reaction system in such pressure has the advantage that members constituting a reactor are inexpensive. From this point of view, it is preferable to avoid a pressurizing condition that needs an expensive pressurized vessel as the pressure in the reaction system. The solvent used for the second solvent is preferably a solvent that does not substantially cause any undesirable side reaction such as degradation or crosslinking of the PAS component. Examples of the preferable solvent include alcohol/phenol solvents such as methanol, ethanol, propanol, butanol, pentanol, ethylene glycol, propylene glycol, phenol, cresol and polyethylene glycol; hydrocarbon solvents such as pentane, hexane, heptane, octane, cyclohexane and cyclopentane; ketone solvents such as acetone, methyl ethyl ketone, diethyl ketone, methyl isobutyl ketone, methyl butyl ketone and acetophenone; carboxylate solvents such as methyl acetate, ethyl acetate, pentyl acetate, octyl acetate, methyl butyrate, ethyl butyrate, pentyl butyrate, methyl salicylate and ethyl formate; and water. Among them, preferable are methanol, ethanol, propanol, butanol, pentanol, ethylene glycol, propylene glycol, pentane, hexane, heptane, octane, cyclohexane, cyclopentane, acetone, methyl acetate, ethyl acetate and water. Especially preferable are methanol, ethanol, propanol, ethylene glycol, pentane, hexane, heptane, octane, cyclohexane, acetone, ethyl acetate and water. One of these solvents or a mixture of two or more of these solvents may be used as the second solvent.

The temperature for exposure of the cyclic PAS to the second solvent is not specifically limited, but the upper limit temperature is preferably a reflux temperature of the second solvent under ordinary pressure. In an application using the preferable second solvent described above, the temperature range is, for example, preferably 20 to 100° C. and is more preferably 25 to 80° C.

The time for exposure of the cyclic PAS to the second solvent differs according to, for example, the solvent species used and the temperature and is thus not unequivocally determinable. The time may be, however, for example, 1 minute to 50 hours. The time in this range is likely to sufficiently dissolve the impurity included in the cyclic PAS into the second solvent.

The method employed to expose the cyclic PAS to the second solvent may be, for example, a method of mixing the cyclic PAS in the solid form with the second solvent with stirring as appropriate, a method of spraying the second solvent onto the cyclic PAS in the solid form placed on any of various filters to simultaneously dissolve the impurity in the second solvent, a method of Soxhlet extraction using the second solvent, or a method of exposing a solution of the cyclic PAS or a solvent-containing cyclic PAS slurry to the second solvent to make the cyclic PAS precipitate in the presence of the second solvent. Among these methods, the method of exposing the solvent-containing cyclic PAS slurry to the second solvent is effective to provide the high-purity cyclic PAS after the operation.

After exposure of the cyclic PAS to the second solvent, the cyclic PAS in the solid form may be recovered by a known solid-liquid separation technique. The solid-liquid separation technique may be, for example, separation by filtration, centrifugal separation or decantation. When some impurity still remains in the cyclic PAS obtained after solid-liquid separation, the obtained cyclic PAS may be exposed to the second solvent again, for the purpose of further removal of the impurity.

(9) Properties of Cyclic PAS According to Embodiment of Invention

The polyarylene sulfide obtained as the cyclic PAS by the method described above is high-purity cyclic PAS that includes the cyclic PAS of generally not lower than 50% by weight, preferably not lower than 70% by weight or more preferably not lower than 80% by weight, and has different properties from those of the generally obtained linear PAS to be highly useful in industry. The cyclic PAS obtained by the production method according to the embodiment of the invention is unlikely to have a single number m in the above formula (A) but is characteristically likely to have different numbers m in the range of m=4 to 50 in the above formula (A). The range of the number m is preferably 4 to 25 and is more preferably 4 to 20. When being used as a raw material for producing a PAS polymer (polymer of high degree of polymerization) described later, the cyclic PAS having the number m in this range is likely to facilitate the polymerization reaction and readily provide a high molecular-weight polymer. This reason is not clear at the moment, but may be attributed to that the cyclic PAS having m in this range has high bond strain due to ring molecules, which is likely to increase the molecular weight during polymerization.

The cyclic PAS having a single number m is obtained as a single crystal and has an extremely high melting temperature. The cyclic PAS according to the embodiment of the invention is, on the other hand, characteristically likely to be obtained as a mixture having different numbers m and thereby have a low melting temperature. This leads to the advantageous characteristic of decreasing the heating temperature in application using the cyclic PAS in the molten state.

(10) Resin Composition Including Cyclic PAS According to Embodiment of Invention The cyclic PAS obtained according to the embodiment of the invention may be used to be mixed with various resins. A resin composition including this cyclic PAS is likely to have excellent flowability and excellent melt stability during melt processing. Such characteristic, especially the enhanced flowability, leads to the excellent melt processability even at low heating temperature during melt processing of the resin composition and thus advantageously improves the melt processability in manufacture of injection molded products and extrusion molded products such as fibers and films. The reason of such improvement in characteristic by mixing the cyclic PAS is not clear but may be attributed to the structural specificity of the cyclic PAS, i.e., the compact geometry due to the ring structure compared with the general linear compound. This structural specificity makes the cyclic PAS likely to have little tangles with the various resins used as the matrix, to act as a plasticizer for the various resins and to suppress tangles in the matrix resin.

The mixing amount of the cyclic PAS to be mixed with the various resins is not specifically limited, but significant improvement of the characteristic is achievable by mixing 0.1 parts by weight or more or preferably 0.5 parts by weight or more of the cyclic PAS according to the embodiment of the invention relative to 100 parts by weight of the various resins. Significant improvement of the characteristic is also achievable by mixing 50 parts by weight or less, preferably 20 parts by weight or less or more preferably 10 parts by weight or less of the cyclic PAS.

Additionally, fibrous and/or non-fibrous fillers may be additionally mixed in the above resin composition as appropriate. The mixing amount of the filler is, for example, 0.5 parts by weight or more and is preferably 1 part by weight or more relative to 100 parts by weight of the above various resins. The mixing amount of the filler is also, for example, 400 parts by weight or less, is preferably 300 parts by weight or less, is more preferably 200 parts by weight or less and is furthermore preferably 100 parts by weight or less. Controlling the mixing amount of the filler in this range is likely to improve the mechanical strength of the resin composition while maintaining the excellent flowability. The type of the filler used may be any of fibrous, plate-like, powdery and granular fillers. Preferable specific examples of the filler include glass fibers and layered silicates such as talc, wollastonite, montmorillonite and synthetic mica. Especially preferable are glass fibers. The type of the glass fiber used is not specifically limited but may be any glass fiber generally used for reinforcement of resin. The glass fiber used may be selected from, for example, long glass fibers, short chopped strands and short milled fibers. Two or more of the above fillers may be used in combination. The above filler used according to the embodiment of the invention may be used after surface treatment with a known coupling agent (for example, silane coupling agent, titanate coupling agent) or another surface treatment agent. The glass fibers may be coated with or bundled with a thermoplastic resin such as ethylene-vinyl acetate copolymer or a thermosetting resin such as epoxy resin.

In order to maintain the thermal stability of the resin composition, one or more heat resistant material selected among phenolic compounds and phosphorous compounds may be contained in the resin composition. In terms of the effect of improving the heat resistance, the mixing amount of the heat resistant material is preferably equal to or more than 0.01 parts by weight and is especially preferably equal to or more than 0.02 parts by weight relative to 100 parts by weight of the above various resins. In terms of the gas component produced during molding, the mixing amount of the heat resistant material is preferably equal to or less than 5 parts by weight and is especially preferably equal to or less than 1 part by weight relative to 100 parts by weight of the above various resins. Combined use of the phenolic compound with the phosphorus compound is especially preferable, since it has significant effects of maintaining the heat resistance, thermal stability and flowability.

The following compound may further be mixed in the above resin composition: coupling agents such as organotitanate compounds and organoborane compounds; plasticizers such as poly(alkylene oxide) oligomer compounds, thioether compounds, ester compounds and organophosphorus compounds; crystal nucleating agents such as talc, kaolin, organophosphorus compounds and poly(ether ether ketone)s; metal soaps such as montanic acid waxes, lithium stearate and aluminum stearate; mold release agents such as polycondensation products of ethylene diamine/stearic acid/sebacic acid and silicone compounds; color protection agents such as hypophosphites; and other general additives including lubricants, ultraviolet protection agents, coloring agents, flame retardants and foaming agents. Addition of any of the above compounds by the amount of less than 20 parts by weight, preferably the amount of not more than 10 parts by weight or more preferably the amount of not more than 1 part by weight relative to 100 parts by weight of the above various resins is likely to have the beneficial effects.

The method of manufacturing the resin composition including the cyclic PAS described above is not specifically limited. For example, an applicable method may premix the cyclic PAS with various resins and optionally with a filler and various additives and melt-kneads the mixture at temperature of not lower than the melting points of the various resins and the cyclic PAS by a generally known melt mixing machine, such as a single-screw extruder, a twin-screw extruder, a Banbury mixer, a kneader, or a mixing roll. Another applicable method may premix the materials of the resin composition in a solution and subsequently remove a solvent. In an application using a simple cyclic PAS, i.e., a cyclic PAS having a single number m in the above formula (A) as the cyclic PAS or in an application using a mixture of cyclic PASes of different numbers m having high crystallinity and a high melting point as the cyclic PAS, an applicable method may dissolve the cyclic PAS in a solvent that is capable of dissolving the cyclic PAS, supply the cyclic PAS-dissolved solution to a melt mixing machine and remove the solvent during melt-kneading. In such applications, another applicable method may melt the cyclic PAS at the temperature of not lower than its melting point, rapidly cool down the melt cyclic PAS to suppress crystallization and supply the cyclic PAS in amorphous form to a melt mixing machine. In such applications, yet another applicable method may set a pre-melter at the temperature of not lower than the melting point of the cyclic PAS, melt only the cyclic PAS in the pre-melter and supply the melt to a melt mixing machine.

There is no specific limitation with respect to the various resins to be mixed with the cyclic PAS. The invention is applicable to both crystalline resins and amorphous resins, as well as to both thermoplastic resins and thermosetting resins.

Specific examples of the crystalline resin include polyolefin resins such as polyethylene resins, polypropylene resins and syndiotactic polystyrene, polyvinyl alcohol resins, polyvinylidene chloride resins, polyester resins, polyamide resins, polyacetal resins, polyphenylene sulfide resins, poly(ether ether ketone) resins, polyether ketone resins, polyketone resins, polyimide resins and their copolymers. One of such resins or a combination of two or more of such resins may be used. Among them, in terms of the heat resistance, the moldability, the flowability and the mechanical properties, polyphenylene sulfide resins, polyamide resins and polyester resins are preferable. In terms of the transparency of resulting molded products, polyester resins are preferable. Using the crystalline resin as the various resins is likely to improve the crystallization characteristics, in addition to improvement of the flowability described above. It is also especially preferable to use the polyphenylene sulfide resin as the various resins. This is likely to achieve improvement of the crystallinity along with improvement of the flowability and is additionally likely to significantly suppress the appearance of burrs during injection molding as the result of such improvements.

The amorphous resin is not specifically limited but may be any resin that is amorphous and melt-moldable. In terms of the heat resistance, however, the amorphous resin used has the glass transition temperature of preferably not lower than 50° C., more preferably not lower than 60° C., furthermore preferably not lower than 70° C. or especially preferably not lower than 80° C. The upper limit of the glass transition temperature is not specifically limited, but is preferably not higher than 300° C. and is more preferably not higher than 280° C. in terms of, for example, the moldability. According to the embodiment of the invention, the glass transition temperature of the amorphous resin indicates a glass transition temperature (Tg) observed by differential calorimetry that heats the amorphous resin at a temperature rise condition of 20° C./minute from 30° C. to an expected glass transition temperature or higher, keeps the amorphous resin at the raised temperature for 1 minute, subsequently cools down the amorphous resin to 0° C. at a temperature decrease condition of 20° C./minute, keeps the amorphous resin at the decreased temperature for 1 minute and then makes a measurement at a temperature re-rise condition of 20° C./minute. A specific example of such amorphous resin may be at least one selected among amorphous nylon resins, polycarbonate (PC) resins, polyarylate resins, ABS resins, poly(meth)acrylate resins, poly(meth)acrylate copolymers, polysulfone resins and polyether sulfone resins. One of such resins or a combination of two or more of such resins may be used. Among these amorphous resins, preferably used are polycarbonate (PC) resins having especially high transparency, transparent ABS resins included in ABS resins, polyarylate resins, poly(meth)acrylate resins, poly(meth)acrylate copolymers and polyether sulfone resins. Using the amorphous resin having excellent transparency as the various resins has the advantageous characteristic of maintaining the high transparency, in addition to improvement of the flowability during melt processing described above. When the high transparency is desired for the amorphous resin composition, it is preferable to use a mixture of cyclic PASes having different numbers m in the above formula (A) as the cyclic PAS. A simple cyclic PAS, i.e., a cyclic PAS having a single number m in the above formula (A), used as the cyclic PAS tends to have the high melting point and is thus likely to be only insufficiently melted and dispersed during melt-kneading with the amorphous resin, thereby producing aggregates in the resin and decreasing the transparency. A mixture of cyclic PASes having different numbers m in the above formula (A) is, on the other hand, likely to have the low melting point as described above, which is advantageous for improving the uniformity during melt-kneading. The cyclic PAS obtained by the production method according to the embodiment of the invention is unlikely to have a single number m in the above formula (A) but is characteristically likely to have different numbers m in the range of m=4 to 50 in the above formula (A). This is especially advantageous when the amorphous resin composition obtained is desired to have high transparency.

The resin composition obtained by mixing the cyclic PAS with the various resins as described above may be molded by any of generally known techniques, for example, injection molding, extrusion molding, blow molding, press molding or spinning and may be processed to and used as a variety of molded products. Examples of the available molded products include injection molded products, extrusion molded products, blow molded products, films, sheets and fibers. The variety of products thus obtained may be used in a variety of applications including automobile parts, electric and electronic parts, architectural components, various vessels and containers, daily necessities, household goods and sanitary articles. The above resin composition and its molded products are recyclable. For example, a resin composition obtained by pulverizing the above resin composition and its molded products preferably to the powder level and blending additives as appropriate with the powder may be used similarly to the above resin composition and may be processed to a molded product.

(11) Conversion of Cyclic PAS to Polymer of High Degree of Polymerization

The cyclic PAS recovered according to the embodiment of the invention has the excellent characteristics as described in the preceding section (9) and may thus be preferably used as a prepolymer for production of a PAS polymer, i.e., a polymer of high degree of polymerization. The prepolymer may be the cyclic PAS alone obtained by the recovery method of the cyclic PAS according to the embodiment of the invention or may be the cyclic PAS including a certain amount of other components. When components other than the cyclic PAS are included, however, it is especially preferable that such components other than the cyclic PAS are PAS components, for example, linear PAS and PAS of branch structure. A polyarylene sulfide prepolymer includes at least the cyclic PAS according to the embodiment of the invention and is enabled to be converted to a polymer of high degree of polymerization by a method described below. This may be hereinafter referred to as PAS prepolymer.

Conversion of the cyclic PAS to a polymer of high degree of polymerization may be performed under conditions that produce the polymer of high degree of polymerization from the cyclic PAS as the raw material. For example, a preferable method may heat the PAS prepolymer including the cyclic PAS obtained by the production method of the cyclic PAS according to the embodiment of the invention to convert the PAS prepolymer to the polymer of high degree of polymerization. The temperature of such heating is preferably the temperature of melting the above PAS prepolymer. There is no further limitation with regard to this temperature condition. The heating temperature of lower than the melting temperature of the PAS prepolymer is likely to increase the time required for obtaining the high molecular-weight PAS. The melting temperature of the PAS prepolymer depends on the composition and the molecular weight of the PAS prepolymer and the environment during heating and is thus not unequivocally determinable. The melting temperature may, however, be obtainable, for example, by analyzing the PAS prepolymer with a differential scanning calorimeter. The excessively high heating temperature is likely to cause undesirable side reactions, such as crosslinking reaction and degradation reaction of the PAS prepolymer, of the resulting PAS produced by heating and between the resulting PAS produced by heating and the PAS prepolymer, which may result in degrading the characteristics of the resulting PAS. It is accordingly desirable to avoid the temperature that significantly causes such undesirable side reactions. The heating temperature likely to suppress such undesirable side reactions is, for example, equal to or higher than 180° C., is preferably equal to or higher than 200° C. and is more preferably equal to or higher than 250° C. The above heating temperature is also, for example, equal to or lower than 400° C., is preferably equal to or lower than 380° C. and is more preferably equal to or lower than 360° C. When a certain degree of side reactions does not cause any substantial trouble, on the other hand, the temperature may exceed 400° C. The temperature range of not higher than 450° C. or preferably of not higher than 420° C. is also selectable. Such temperature range has the advantage of achieving conversion to a polymer of high degree of polymerization in a very short time.

The time for the above heating differs depending on various characteristics, such as the content rate, the numbers m and the molecular weight, of the cyclic PAS included in the PAS prepolymer used and conditions including the heating temperature and is thus not unequivocally determinable. It is, however, preferable to set such a heating time that minimizes the undesirable side reactions described above. The heating time is, for example, equal to or more than 0.05 hours and is preferably equal to or more than 0.1 hours. The heating time is also, for example, equal to or less than 100 hours, is preferably equal to or less than 20 hours and is more preferably equal to or less than 10 hours. The heating time of less than 0.05 hours is likely to cause insufficient conversion of the PAS prepolymer to the PAS. The heating time of more than 100 hours is, on the other hand, likely to cause adverse effects of the undesirable side reactions on the properties of the resulting PAS and may also suffer economic disadvantage.

Any of various catalyst components accelerating conversion may be used in the process of conversion of the PAS prepolymer to the polymer of high degree of polymerization by heating. The catalyst component may be, for example, an ionic compound or a compound having a radical-generating ability. Examples of the ionic compound include sodium salt and lithium salt of thiophenol and alkali metal salts of sulfur. The compound having the radical-generating ability is, for example, a compound generating a sulfur radical by heating and is more specifically a disulfide bond-containing compound. In an application using the various catalyst components, the catalyst component is generally incorporated in the PAS, so that the resulting PAS often contains the catalyst component. Especially in an application using an ionic compound containing an alkali metal and/or another metal component as the catalyst component, most part of the metal component included in this catalyst component is likely to remain in the resulting PAS. The PAS produced by using the various catalyst components is likely to increase the weight loss in the course of heating the PAS. Accordingly, in order to obtain the PAS of the higher purity and/or the PAS having the less weight loss in the course of heating, it is desirable to minimize the amount of the catalyst component used or more desirable to use no catalyst component. In the application using the various catalyst components for conversion of the PAS prepolymer to the polymer of high degree of polymerization, it is accordingly preferable to adjust the addition amount of the catalyst component, such that the amount of the alkali metal in the reaction system including the PAS prepolymer and the catalyst component is not more than 100 ppm, is preferably not more than 50 ppm, is more preferably not more than 30 ppm and is furthermore preferably not more than 10 ppm and that the weight fraction of sulfur atom forming the disulfide group to the overall weight of all sulfur atoms in the reaction system is less than 1% by weight, is preferably less than 0.5% by weight, is more preferably less than 0.3% by weight and is furthermore preferably less than 0.1% by weight.

Conversion of the PAS prepolymer to the polymer of high degree of polymerization by heating is generally performed in the absence of a solvent but may be performed in the presence of a solvent. This solvent is not specifically limited but may be any solvent that does not substantially interfere with the conversion of the PAS prepolymer to the polymer of high degree of polymerization by heating or does not substantially cause undesirable side reactions, such as degradation and crosslinking of the resulting PAS. Examples of this solvent include nitrogen-containing polar solvents such as N-methyl-2-pyrrolidone, dimethylformamide and dimethylacetamide; sulfoxide and sulfone solvents such as dimethyl sulfoxide and dimethyl sulfone; ketone solvents such as acetone, methyl ethyl ketone, diethyl ketone and acetophenone; ether solvents such as dimethyl ether, dipropyl ether and tetrahydrofuran; halogenated solvents such as chloroform, methylene chloride, trichloroethylene, ethylene dichloride, dichloroethane, tetrachloroethane and chlorobenzene; alcohol and phenol solvents such as methanol, ethanol, propanol, butanol, pentanol, ethylene glycol, propylene glycol, phenol, cresol and polyethylene glycol; and aromatic hydrocarbon solvents such as benzene, toluene and xylene. A supercritical fluid of an inorganic compound such as carbon dioxide, nitrogen or water may also be used as the solvent. One of these solvents or a mixture of two or more of these solvents may be used.

The conversion of the PAS prepolymer to the polymer of high degree of polymerization by heating may be performed without limitation using any device equipped with a heating mechanism, for example, performed in a mold for producing a molded product or performed using an extruder or a melt kneader, let alone being performed using a general polymerization reaction device. A known technique such as batch system or continuous system may be employed for such conversion.

The conversion of the PAS prepolymer to the polymer of high degree of polymerization is preferably performed in a non-oxidizing atmosphere and is also preferably performed under reduced pressure condition. When the conversion is performed under reduced pressure, a preferable procedure may control the atmosphere in the reaction system first to the non-oxidizing atmosphere and then to the reduced pressure condition. This is likely to suppress undesirable side reactions, such as crosslinking reaction and degradation reaction of the PAS prepolymer, of the resulting PAS produced by heating and between the resulting PAS produced by heating and the PAS prepolymer. The non-oxidizing atmosphere denotes an atmosphere having an oxygen concentration of not higher than 5% by volume or preferably not higher than 2% by volume in the gas phase to which the PAS component is exposed, and is more preferably an atmosphere that does not substantially contain oxygen or more specifically an inert gas atmosphere such as nitrogen, helium or argon. Among them, nitrogen atmosphere is preferable, due to its economic efficiency and easiness of handling. The reduced pressure condition denotes that the pressure in the reaction system is lower than the atmospheric pressure. The upper limit is preferably not higher than 50 kPa, is more preferably not higher than 20 kPa and is furthermore preferably not higher than 10 kPa. The lower limit is, for example, not lower than 0.1 kPa and is more preferably not lower than 0.2 kPa. The reduced pressure condition of higher than the preferable upper limit is likely to cause the undesirable side reactions such as crosslinking reaction. The reduced pressure condition of lower than the preferable lower limit is, on the other hand, likely to accelerate volatilization of low molecular-weight cyclic polyarylene sulfide included in the PAS prepolymer at some reaction temperatures.

The conversion of the PAS prepolymer to the polymer of high degree of polymerization described above may be performed under coexistence of a fibrous material. The fibrous material herein means a slender threadlike material and is preferably any material of elongated structure, such as natural fibers. The conversion of the PAS prepolymer to the polymer of high degree of polymerization in the presence of the fibrous material facilitates production of a composite material structure of the PAS and the fibrous material. This structure is reinforced by the fibrous material and is thus likely to have, for example, the better mechanical properties, compared with the PAS alone.

Among a variety of fibrous materials, it is preferable to use a long-fibrous reinforced fiber. This enables the PAS to be highly reinforced. In general, in the case of production of a composite material structure of a resin and a fibrous material, the high viscosity of the resin in the molten state is likely to reduce the wettability between the resin and the fibrous material, which may fail to produce a homogeneous composite material or fail to provide expected mechanical properties. The wettability herein means a contact between a fluid material like a molten resin and a solid substrate such as a fibrous compound provided and kept in the good physical state without causing substantially no air or another gas to be trapped between the fluid material and the solid substrate. The lower viscosity of the fluid material is likely to provide the better wettability with the fibrous material. The PAS prepolymer according to the embodiment of the invention has the significantly low viscosity in the molten state, compared with general thermoplastic resins, for example, PAS manufactured by the conventionally known method, and is thus likely to have the good wettability with the fibrous material. After achieving the good wettability between the PAS prepolymer and the fibrous material, the production method of the PAS according to the embodiment of the invention converts the PAS prepolymer to the polymer of high degree of polymerization. This facilitates production of the composite material structure in which the fibrous material and the polymer of high degree of polymerization (polyarylene sulfide) have the good wettability.

The fibrous material is preferably the long-fibrous reinforced fiber as described above. The reinforced fiber used according to the embodiment of the invention is not specifically limited, but the reinforced fiber favorably used may be a fiber of high heat resistance and high tensile strength generally used as high-performance reinforced fiber. Examples of such reinforced fiber include glass fibers, carbon fibers, graphite fibers, aramid fibers, silicon carbide fibers, alumina fibers and boron fibers. Among them, most preferable are carbon fibers and graphite fibers which have high specific strength and high specific modulus and are expected to significantly contribute to weight reduction. The carbon fiber and the graphite fiber used may be any types of carbon fibers according to their applications, but most suitable is a high-strength, high-elongation carbon fiber having the tensile strength of 450 kgf/mm and the tensile elongation of not less than 1.6%. In the case of using the long-fibrous reinforced fiber, the fiber length is preferably 5 cm or longer. This range of the fiber length facilitates the strength of the reinforced fiber to be sufficiently provided in the composite material. The carbon fiber or the graphite fiber used may be mixed with another reinforced fiber. There is no limitation in shape or arrangement of the reinforced fiber. For example, the arrangement of the reinforced fiber used may be a unidirectional arrangement, a random directional arrangement, a sheet-like arrangement, a mat-like arrangement, a fabric-like arrangement or a braid-like arrangement. In applications that need high specific strength and high specific modulus, the reinforced fiber in the unidirectional arrangement is most suitable. The easily-handled reinforced fiber in the cloth (fabric)-like arrangement is also suitable for the embodiment of the invention.

The conversion of the PAS prepolymer to the polymer of high degree of polymerization described above may also be performed in the presence of a filler. The filler used may be, for example, non-fibrous glass, non-fibrous carbon or an inorganic filler such as calcium carbonate, titanium oxide or alumina.

EXAMPLES

The invention is described more specifically with reference to examples. These examples are, however, only illustrative and not restrictive.

<Measurement of Formation Rate of Cyclic Polyphenylene Sulfide>

The formation rate of each cyclic polyphenylene sulfide compound was measured by qualitative and quantitative analyses using HPLC. Measurement conditions of HPLC were as follows:

Apparatus: LC-10Avp Series manufactured by Shimadzu Corporation

Column: Mightysil RP-18 GP150-4.6 (5 μm) manufactured by Kanto Chemical Co., Inc.

Detector: photodiode array detector (wavelength: 270 nm)

The structures of the respective components after component separation by HPLC were determined by liquid chromatography-mass spectrometry (LC-MS), matrix-assisted laser desorption/ionization mass spectrometry (MALDI-MS) of fractions obtained by preparative liquid chromatography (preparative LC), nuclear magnetic resonance spectroscopy (NMR) and infrared spectroscopy (IR spectroscopy). The results of such analyses proved that cyclic polyphenylene sulfides having the number of repeating unit equal to 4 to 15 were qualitatively and quantitatively measurable by HPLC under the above conditions.

<Analysis of Sulfidizing Agent>

Quantitative determination of the sulfidizing agent (quantitative determination of sodium hydrosulfide) in the reaction mixture was performed by ion chromatography under the following conditions:

Apparatus: HIC-20Asuper manufactured by Shimadzu Corporation

Column: Shim-pack IC-SA2 (250 mm×4.6 mm ID) manufactured by Shimadzu Corporation Detector: electrical conductivity detector (suppressor)

Eluent: 4.0 mM sodium hydrogen carbonate/1.0 mM sodium carbonate aqueous solution Flow rate: 1.0 mL/minute Injection volume: 50 microliters Column temperature: 30° C.

After oxidation of the sulfide ion included in a sample by addition of a hydrogen peroxide solution to the sample, the amount of sulfate ion was quantitatively determined by the above analysis. The amount of the sulfide ion in the sample was calculated by subtracting the quantitative value of sulfate ion by analysis of a corresponding untreated sample without addition of the hydrogen peroxide solution. The concentration of the sulfidizing agent in the reaction mixture was calculated on the assumption that the calculated amount of the sulfide ion was equal to the amount of unreacted sulfidizing agent.

<Analysis of Dihalogenated Aromatic Compound>

Quantitative determination of the dihalogenated aromatic compound (quantitative determination of p-dichlorobenzene) in the reaction mixture including the reaction product was performed by gas chromatography under the following conditions:

Apparatus: GC-2010 manufactured by Shimadzu Corporation

Column: J&W DB-5, 0.32 mm×30 m (0.25 µm) manufactured by Agilent Technologies, Inc.

Carrier gas: helium

Detector: flame ionization detector (FID)

<Measurement of Molecular Weight of Linear Polyphenylene Sulfide>

The weight-average molecular weight of the linear polyphenylene sulfide used as the raw material was measured under the following conditions and was determined as a value of standard polystyrene equivalent:

Apparatus: SSC-7100 manufactured by Senshu Scientific Co., Ltd.

Column: Shodex UT806M×2

Column temperature: 210° C.

Mobile phase: 1-chloronaphthalene

Detector: differential refractive index detector

Detector temperature: 210° C.

<Device Configuration>

FIG. 1 is a diagram schematically illustrating the general configuration of a reaction device 10 used in Examples. The reaction device 10 includes containers (I), (II), (III) and (IV). In the container (I), a water-containing sulfidizing agent is subjected to dehydration. The sulfidizing agent dehydrated in the container (I) is transferred through a flow path 20 to the container (II).

In the container (II), a raw material mixture (a) is prepared by mixing the transferred sulfidizing agent with the other raw material components. The container (II) is provided with a circulation line 42 arranged to circulate the raw material mixture (a) into and from the container (II). The circulation line 42 has a pump which is a slurry sealing-type canned motor pump to circulate the raw material mixture (a) by the driving force of the pump. A branch line 22 is connected with the circulation line 42 via a valve. The raw material mixture (a) is supplied from the container (II) to the container (III) via the circulation line 42 and the branch line 22. The amount of the raw material mixture (a) to be supplied from the container (II) to the container (III) is adjustable by controlling the valve opening.

In the container (III), the supplied raw material mixture (a) is heated and reacted at internal pressure which may be controlled to pressure exceeding the ordinary pressure. A reaction mixture (b) is prepared by heating the raw material mixture (a) in this manner. The container (III) is provided with a circulation line 44 arranged to circulate the reaction mixture (b) into and from the container (III). The circulation line 44 has a pump which is a slurry sealing-type canned motor pump to circulate the reaction mixture (b) by the driving force of the pump. A branch line 24 is connected with the circulation line 44 via a valve. The reaction mixture (b) is supplied from the container (III) to the container (IV) via the circulation line 44 and the branch line 24. The amount of the reaction mixture (b) to be supplied from the container (III) to the container (IV) is adjustable by controlling the valve opening. The branch line 24 is provided with a non-illustrated cooling mechanism, so that the hot reaction mixture (b) is cooled down and recovered in the container (IV). The container (III) corresponds to the "reaction vessel" in the claims of the present application, the container (II) corresponds to the "supply container", and the container (IV) corresponds to the "receiving container".

The following describes the details of production conditions and the results of analyses with regard to Examples 1 to 8 and Comparative Examples 1 to 4. The production conditions and the results of analyses with regard to the respective Examples and Comparative Examples are summarized in the following Table 1 and Table 2.

TABLE 1

|  | EX 1 | EX 2 | EX 3 | EX 4 | COMP EX 1 | COMP EX 2 | COMP EX 3 | COMP EX 4 |
|---|---|---|---|---|---|---|---|---|
| Raw Material Mixture | (a-1) | (a-2) | (a-3) | (a-4) | (a-1) | (a-2) | (a-3) | (a-4) |
| Raw Material Supply System | Continual System | Continual System | Continual System | Continual System | Batch System | Batch System | Batch System | Batch System |
| Mode of Operations (A) and (B) | Continuous | Continuous | Continuous | Continuous | — | — | — | — |
| Initial Reaction | Batch Type | Batch Type | Batch Type | Batch Type | None | None | None | None |
| Average Retention Time (hours) | 2 | 2 | 2 | 2 | 2 | 2 | 2 | 2 |
| Linear PAS in Raw Material Mixture | Not Present | Present | Not Present | Not Present | Not Present | Present | Not Present | Not Present |
| Volume (L) of Organic Polar Solvent per 1 mol of S | 1.96 | 1.96 | 3.34 | 1.43 | 1.96 | 1.96 | 3.34 | 1.43 |
| Operation (D) | Not Performed | Not Performed | Not Performed | Not Performed | Not Performed | Not Performed | Not Performed | Not Performed |
| Substrate Concentration of (b) | Constant | Constant | Constant | Constant | Constant | Constant | Constant | Constant |
| Amount of (b) | Constant | Constant | Constant | Constant | — | — | — | — |
| Ratio (%) of Sulfidizing Agent Concentration | 2 | 4 | 2 | 2 | 5 | 5 | 5 | 3 |
| Ratio (%) of Dihalogenated Aromatic Compound Concentration | 3 | 9 | 3 | 3 | 6 | 9 | 6 | 4 |
| Sulfidizing Agent Concentration (mol/kg) in Reaction Mixture | 0.009 | 0.004 | 0.006 | 0.012 | 0.022 | 0.005 | 0.014 | 0.017 |

TABLE 1-continued

|  | EX 1 | EX 2 | EX 3 | EX 4 | COMP EX 1 | COMP EX 2 | COMP EX 3 | COMP EX 4 |
|---|---|---|---|---|---|---|---|---|
| Dihalogenated Aromatic Compound Concentration (mol/kg) in Reaction Mixture | 0.014 | 0.009 | 0.008 | 0.018 | 0.027 | 0.009 | 0.017 | 0.024 |
| Formation Rate (%) of Cyclic PPS | 17 | 15 | 21 | 12 | 14 | 12 | 18 | 10 |

TABLE 2

|  | EX 5 | EX 6 | EX 7 | EX 8 | COMP EX 5 |
|---|---|---|---|---|---|
| Raw Material Mixture | (a-1) | (a-1) | (a-1) ↓ (a-5) | (a-1) | (a-1) |
| Raw Material Supply System | Continual System | Continual System | Continual System | Continual System | Batch System |
| Mode of Operations (A) and (B) | Continuous | Continuous | Continuous | Continuous | — |
| Initial Reaction | Batch Type | Batch Type | Batch Type | Continuous Type | None |
| Average Retention Time (hours) | 1 | 2 | 2 | 2 | 1 |
| Linear PAS in Raw Material Mixture | Not Present | Not Present | Not Present | Not Present | Not Present |
| Volume (L) of Organic Polar Solvent per 1 mol of S | 1.96 | 1.96 | 1.96 ↓ 3.33 | 1.96 | 1.96 |
| Operation (D) | Not Performed | Performed | Not Performed | Not Performed | Not Performed |
| Substrate Concentration of (b) | Constant | Constant | Varied | Constant | Constant |
| Amount of (b) | Constant | Constant | Constant | Constant | — |
| Ratio (%) of Sulfidizing Agent Concentration | 11 | 1 | 2 | — | 12 |
| Ratio (%) of Dihalogenated Aromatic Compound Concentration | 13 | 2 | 3 | — | 15 |
| Sulfidizing Agent Concentration (mol/kg) in Reaction Mixture | 0.049 | 0.004 | 0.005 | — | 0.053 |
| Dihalogenated Aromatic Compound Concentration (mol/kg) in Reaction Mixture | 0.059 | 0.009 | 0.008 | — | 0.068 |
| Formation Rate (%) of Cyclic PPS | 15 | 18 | 20 | — | 13 |

Example 1

Preparation of Raw Material Mixture (a-1)

In a 70 liter SUS 316 container (I) equipped with an agitator and a rectifying column, 14.6 kg of a 48% by weight of sodium hydrosulfide aqueous solution (7.0 kg or 125 mol as sodium hydrosulfide), 10.9 kg of a 48% by weight of sodium hydroxide aqueous solution (5.2 kg or 131 mol as sodium hydroxide) and 25.0 kg (24.4 liters) of N-methyl-2-pyrrolidone (NMP) were placed and were gradually heated to 205° C. with a stream of nitrogen gas for a dehydration operation. A distillate obtained by the dehydration operation was analyzed by gas chromatography. According to the results of gas chromatography, the distillate included 0.15 kg (0.15 liters) of NMP, and 24.9 kg (24.2 liters) of NMP remained in the container (I). Hydrogen sulfide released from the reaction system through the dehydration process was 2.5 mol. This indicates a decrease in sodium hydrosulfide by 2.5 mol and an increase in sodium hydroxide by 2.5 mol in the container (I) by the release of hydrogen sulfide.

Subsequently, the mixture after removal of water by the preceding dehydration operation was placed in a 300 liter SUS 316 container (II) equipped with an agitator, and a raw material mixture (a-1) was prepared by further adding 221 kg (216 liters) of NMP and 18.4 kg (125 mol) of p-dichlorobenzene (p-DCB). The substrate concentration of sulfur content expressed by the volume of the organic polar solvent in the raw material mixture (a-1) was 1.96 liters per 1 mol of the sulfur content. The substrate concentration of arylene unit expressed by the volume of the organic polar solvent was 1.92 liters per 1 mol of the arylene unit. The amount of the arylene unit in the raw material mixture (a-1) was 1.02 mol per 1 mol of the sulfur content. In the container (II), the raw material mixture (a-1) was maintained at the internal temperature of 140° C. with stirring.

<Preparation of Initial Reaction Mixture>

The raw material mixture (a-1) of 40 kg prepared in the container (II) was supplied into a 70 liter SUS 316 container (III) equipped with an agitator, was sealed in nitrogen, was heated to the internal temperature of 250° C. and was then kept at this raised temperature for 2 hours for an initial reaction. This gave an initial reaction mixture. The pressure in the container (III) after the initial reaction was 0.4 MPa. The initial reaction mixture was sampled and analyzed. According to the results of analysis, the concentration of the unreacted sulfidizing agent in the initial reaction mixture or more specifically the amount of the unreacted sulfidizing agent included in 1 kilogram of the initial reaction mixture was 0.022 mol. The ratio of the sulfidizing agent concentration of the initial reaction mixture to the sulfidizing agent concentration of the raw material mixture (a-1) was 5%. The concentration of the unreacted dihalogenated aromatic compound in the initial reaction mixture or more specifically the amount of the unreacted dihalogenated aromatic compound included in 1 kilogram of the initial reaction mixture was 0.027 mol. The ratio of the dihalogenated aromatic compound concentration of the initial reaction mixture to the dihalogenated aromatic compound concentration of the raw material mixture (a-1) was 6%. The formation rate of cyclic PPS was 14%. Since neither volatilized component nor additional component is involved in this reaction, there is no change in weight of the initial reaction mixture. The substrate concentration is accordingly regarded as being kept equal to that of the raw material mixture (a-1).

<Synthesis of Cyclic PAS>

The raw material mixture (a-1) was continuously supplied at a rate of 20 kg/hour from the container (II) to the container (III) including the above initial reaction mixture by using the slurry sealing-type canned motor pump, while the internal temperature of the container (III) was maintained at 250° C. (operation A). Simultaneously, the reaction mixture (b) was continuously withdrawn from the container (III) at a rate of 20 kg/hour by using the slurry sealing-type canned motor pump (operation B), was cooled down to or below 200° C. in the piping and was transferred to the container (IV) as the receiving container, so as to obtain a mixture including cyclic PPS. This series of operations was continued for 10 hours.

During this series of operations, the pressure in the container (III) was kept constant at 0.4 MPa. The container (II) had neither addition of a component nor volatilization of a component other than supply of the raw material mixture (a-1). The container (III) had neither addition of a component nor volatilization of a component other than supply of the raw material mixture (a-1) and withdrawal of the reaction mixture (b). The substrate concentration of the reaction mixture (b) in the container (III) is accordingly regarded as being equal to that of the initial reaction mixture and as being kept constant. The liquid surface of the container (III) was unchanged, so that the amount of the reaction mixture (b) is also regarded as being kept constant.

At the times of 5 hours and 10 hours after the start of this series of operations, the reaction mixture (b) was sampled from the container (III) and analyzed. At the time of 5 hours after, the concentration of the unreacted sulfidizing agent in the reaction mixture (b) or more specifically the amount of the unreacted sulfidizing agent included in 1 kilogram of the reaction mixture (b) was 0.009 mol. The ratio of the sulfidizing agent concentration of the reaction mixture (b) to the sulfidizing agent concentration of the raw material mixture (a-1) was 2%. The concentration of the unreacted dihalogenated aromatic compound in the reaction mixture (b) or more specifically the amount of the unreacted dihalogenated aromatic compound included in 1 kilogram of the reaction mixture (b) was 0.014 mol. The ratio of the dihalogenated aromatic compound concentration of the reaction mixture (b) to the dihalogenated aromatic compound concentration of the raw material mixture (a-1) was 3%. The formation rate of cyclic PPS was 16%. At the time of 10 hours after, the concentration of the unreacted sulfidizing agent in the reaction mixture (b) or more specifically the amount of the unreacted sulfidizing agent included in 1 kilogram of the reaction mixture (b) was 0.009 mol. The ratio of the sulfidizing agent concentration of the reaction mixture (b) to the sulfidizing agent concentration of the raw material mixture (a-1) was 2%. The concentration of the unreacted dihalogenated aromatic compound in the reaction mixture (b) or more specifically the amount of the unreacted dihalogenated aromatic compound included in 1 kilogram of the reaction mixture (b) was 0.014 mol. The ratio of the dihalogenated aromatic compound concentration of the reaction mixture (b) to the dihalogenated aromatic compound concentration of the raw material mixture (a-1) was 3%. The formation rate of cyclic PPS was 17%.

The results of this example show that the preferable method of the invention enables the cyclic PPS to be continuously produced at the high and constant formation rate by keeping the substrate concentration constant. This method accordingly ensures synthesis of cyclic PPS with high efficiency.

Comparative Example 1

The following describes an example of synthesizing cyclic PAS in the batch system without supply of the raw material mixture (a) (operation A) and withdrawal of the reaction mixture (b) (operation B).

The raw material mixture (a-1) of 40 kg prepared in Example 1 described above was supplied into a 70 liter SUS 316 container (III) equipped with an agitator, was sealed in nitrogen, was heated to the internal temperature of 250° C. and was then kept at this raised temperature for 2 hours for a polymerization reaction. This gave a reaction mixture including a reaction product. The pressure in the container (III) after the reaction was 0.4 MPa. The obtained reaction mixture was sampled and analyzed. According to the results of analysis, the concentration of the unreacted sulfidizing agent in the reaction mixture or more specifically the amount of the unreacted sulfidizing agent included in 1 kilogram of the reaction mixture was 0.022 mol. The ratio of the sulfidizing agent concentration of the reaction mixture to the sulfidizing agent concentration of the raw material mixture (a-1) was 5%. The concentration of the unreacted dihalogenated aromatic compound in the reaction mixture or more specifically the amount of the unreacted dihalogenated aromatic compound included in 1 kilogram of the reaction mixture was 0.027 mol. The ratio of the dihalogenated aromatic compound concentration of the reaction mixture to the dihalogenated aromatic compound concentration of the raw material mixture (a-1) was 6%. The formation rate of cyclic PPS was 14%. Since neither volatilized component nor additional component is involved in this reaction, there is no change in weight of the reaction mixture. The substrate concentration is accordingly regarded as being kept equal to that of the raw material mixture (a-1).

This comparative example uses the same raw material mixture (a-1) as that of Example 1 and has the reaction time of 2 hours, which is equal to the average retention time in synthesis of cyclic PAS in Example 1. The formation rate of cyclic PPS in this comparative example is, however, lower than that in Example 1. Comparison between the results of Example 1 and the results of Comparative Example 1 proves the advantageous effect of the invention; i.e., continually performing the operation A and the operation B improves the formation rate of cyclic polyarylene sulfide, compared with the formation rate in the batch system.

Reference Example 1

The following describes an example of producing linear polyarylene sulfide by a prior art method. More specifically, the method heats and reacts a sulfidizing agent and a dihalogenated aromatic compound using 1.25 liters or more of an organic polar solvent per 1 mol of the sulfur content of the sulfidizing agent, separates linear polyarylene sulfide from cyclic polyarylene sulfide by solid-liquid separation of a resulting reaction mixture, and washes a resulting solid substance containing a solvent with water to produce linear polyarylene sulfide.

In a 10 liter SUS reaction tank equipped with an agitator and a rectifying column, 2.46 kg of a 48% by weight of sodium hydrosulfide aqueous solution (1.18 kg or 21.1 mol as sodium hydrosulfide), 1.84 kg of a 48% by weight of sodium hydroxide aqueous solution (0.88 kg or 22.1 mol as sodium hydroxide) and 4.43 kg (4.32 liters) of N-methyl-2-pyrrolidone were placed and were gradually heated to 205° C. with a stream of nitrogen gas for a dehydration operation. A distillate obtained by the dehydration operation was analyzed by gas chromatography. According to the results of gas chromatography, the distillate included 0.027 kg (0.026 liters) of NMP, and 4.40 kg (4.30 liters) of NMP remained in the reaction tank. Hydrogen sulfide released from the reaction system through the dehydration process was 0.42 mol. This indicates a decrease in sodium hydrosulfide by 0.42 mol and an increase in sodium hydroxide by 0.42 mol in the reaction tank by the release of hydrogen sulfide.

Subsequently, the mixture after removal of water by the preceding dehydration operation was placed in a 70 liter SUS reaction tank equipped with an agitator. After addition of 50.2 kg (49.0 liters) of NMP and 3.15 kg (21.4 mol) of DCB, the reaction tank was sealed in nitrogen gas. The mixture was heated to 250° C. in 1 hour with stirring, was kept at 250° C. for 2 hours and was subsequently cooled down. The resulting reaction mixture was analyzed by gas chromatography and high-performance liquid chromatography. The consumption rate of DCB in the monomer was 92%, and the formation rate of cyclic polyarylene sulfide was 16.7%.

The resulting reaction mixture or more specifically the reaction mixture including at least cyclic PPS, linear PPS, NMP and NaCl as a byproduct salt was then subjected to solid-liquid separation by a centrifugal dehydrator. This operation gave a solid substance in the wet state. The obtained solid substance in the wet state was washed sufficiently with warm water and was then dried. This gave 1.54 kg of a dried solid.

The above series of operations was repeated, and 10.9 kg of linear PPS was obtained.

The obtained solid was analyzed. The absorption spectrum in infrared spectroscopy (apparatus: FTIR-8100A manufactured by Shimadzu Corporation) identified the obtained solid as linear polyphenylene sulfide. The weight-average molecular weight was 10,000.

Example 2

The following describes an example of preparing a raw material mixture (a) including linear polyarylene sulfide, in addition to a sulfidizing agent, a dihalogenated aromatic compound and an organic polar solvent to produce cyclic PAS.

<Preparation of Raw Material Mixture (a-2)>

After the dehydration operation in the same manner as Example 1, one fifth of the mixture after removal of water by the preceding dehydration operation (1.4 kg (24.5 mol) as sodium hydrosulfide) and 5.0 kg (48 liters) as NMP) was placed in a 300 liter SUS 316 container (II) equipped with an agitator, and a raw material mixture (a-2) was prepared by further adding 10.6 kg of the linear PPS prepared in Reference Example 1 (98.0 mol as the sulfur content and the arylene content), 241 kg (235 liters) of NMP and 3.9 kg (26.5 mol) of p-dichlorobenzene (p-DCB). Accordingly, the substrate concentration of sulfur content expressed by the volume of the organic polar solvent in the raw material mixture (a-2) was 1.96 liters per 1 mol of the sulfur content. The substrate concentration of arylene unit expressed by the volume of the organic polar solvent was 1.92 liters per 1 mol of the arylene unit. The amount of the arylene unit in the raw material mixture (a-2) was 1.02 mol per 1 mol of the sulfur content. In the container (II), the raw material mixture (a-2) was maintained at the internal temperature of 140° C. with stirring.

<Preparation of Initial Reaction Mixture>

The raw material mixture (a-2) of 40 kg prepared as described above was supplied into a 70 liter SUS 316 container (III) equipped with an agitator, was sealed in nitrogen, was heated to the internal temperature of 250° C. and was then kept at this raised temperature for 2 hours for an initial reaction. This gave an initial reaction mixture. The pressure in the container (III) after the initial reaction was 0.3 MPa. The initial reaction mixture was sampled and analyzed. According to the results of analysis, the concentration of the unreacted sulfidizing agent in the initial reaction mixture or more specifically the amount of the unreacted sulfidizing agent included in 1 kilogram of the initial reaction mixture was 0.005 mol. The ratio of the sulfidizing agent concentration of the initial reaction mixture to the sulfidizing agent concentration of the raw material mixture (a-2) was 5%. The concentration of the unreacted dihalogenated aromatic compound in the initial reaction mixture or more specifically the amount of the unreacted dihalogenated aromatic compound included in 1 kilogram of the initial reaction mixture was 0.009 mol. The ratio of the dihalogenated aromatic compound concentration of the initial reaction mixture to the dihalogenated aromatic compound concentration of the raw material mixture (a-2) was 9%. The formation rate of cyclic PPS was 12%. Since neither volatilized component nor additional component is involved in this reaction, there is no change in weight of the initial reaction mixture. The substrate concentration is accordingly regarded as being kept equal to that of the raw material mixture (a-2).

<Synthesis of Cyclic PAS>

The raw material mixture (a-2) was continuously supplied at a rate of 20 kg/hour from the container (II) to the container (III) including the above initial reaction mixture by using the slurry sealing-type canned motor pump, while the internal temperature of the container (III) was maintained at 250° C. (operation A). Simultaneously, the reaction mixture (b) was continuously withdrawn from the container (III) at a rate of 20 kg/hour by using the slurry sealing-type canned motor pump (operation B), was cooled down to or below 200° C. in the piping and was transferred to the container (IV) as the receiving container, so as to obtain a mixture including cyclic PPS. This series of operations was continued for 10 hours.

During this series of operations, the pressure in the container (III) was kept constant at 0.3 MPa. The container (II) had neither addition of a component nor volatilization of a component other than supply of the raw material mixture (a-2). The container (III) had neither addition of a component nor volatilization of a component other than supply of the raw material mixture (a-2) and withdrawal of the reaction mixture (b). The substrate concentration of the reaction mixture (b) in the container (III) is accordingly regarded as being equal to that of the initial reaction mixture and as being kept constant. The liquid surface of the container (III) was unchanged, so that the amount of the reaction mixture (b) is also regarded as being kept constant.

At the times of 5 hours and 10 hours after the start of this series of operations, the reaction mixture (b) was sampled from the container (III) and analyzed. At the time of 5 hours after, the concentration of the unreacted sulfidizing agent in the reaction mixture (b) or more specifically the amount of the unreacted sulfidizing agent included in 1 kilogram of the reaction mixture (b) was 0.005 mol. The ratio of the sulfidizing agent concentration of the reaction mixture (b) to the sulfidizing agent concentration of the raw material mixture (a-2) was 5%. The concentration of the unreacted dihalogenated aromatic compound in the reaction mixture (b) or more specifically the amount of the unreacted dihalogenated aromatic compound included in 1 kilogram of the reaction mixture (b) was 0.009 mol. The ratio of the dihalogenated aromatic compound concentration of the reaction mixture (b) to the dihalogenated aromatic compound concentration of the raw material mixture (a-2) was 9%. The formation rate of cyclic PPS was 14%. At the time of 10 hours after, the concentration of the unreacted sulfidizing agent in the reaction mixture (b) or more specifically the amount of the unreacted sulfidizing agent included in 1 kilogram of the reaction mixture (b) was 0.004 mol. The ratio of the sulfidizing agent concentration of the reaction mixture (b) to the sulfidizing agent concentration of the raw material mixture (a-2) was 4%. The concentration of the unreacted dihalogenated aromatic compound in the reaction mixture (b) or more specifically the amount of the unreacted dihalogenated aromatic compound included in 1 kilogram of the reaction mixture (b) was 0.009 mol. The ratio of the dihalogenated aromatic compound concentration of the reaction mixture (b) to the dihalogenated aromatic compound concentration of the raw material mixture (a-2) was 9%. The formation rate of cyclic PPS was 15%.

The results of this example show that the preferable method of the invention using the linear PPS as the raw material component enables the cyclic PPS to be continuously produced at the high and constant formation rate. This method accordingly ensures synthesis of cyclic PPS with high efficiency.

Comparative Example 2

The following describes an example of synthesizing cyclic PAS in the batch system without supply of the raw material mixture (a) (operation A) and withdrawal of the reaction mixture (b) (operation B).

The raw material mixture (a-2) of 40 kg prepared in Example 2 described above was supplied into a 70 liter SUS 316 container (III) equipped with an agitator, was sealed in nitrogen, was heated to the internal temperature of 250° C. and was then kept at this raised temperature for 2 hours for a polymerization reaction. This gave a reaction mixture including a reaction product. The pressure in the container (III) after the reaction was 0.3 MPa. The obtained reaction mixture was sampled and analyzed. According to the results of analysis, the concentration of the unreacted sulfidizing agent in the reaction mixture or more specifically the amount of the unreacted sulfidizing agent included in 1 kilogram of the reaction mixture was 0.005 mol. The ratio of the sulfidizing agent concentration of the reaction mixture to the sulfidizing agent concentration of the raw material mixture (a-2) was 5%. The concentration of the unreacted dihalogenated aromatic compound in the reaction mixture or more specifically the amount of the unreacted dihalogenated aromatic compound included in 1 kilogram of the reaction mixture was 0.009 mol. The ratio of the dihalogenated aromatic compound concentration of the reaction mixture to the dihalogenated aromatic compound concentration of the raw material mixture (a-2) was 9%. The formation rate of cyclic PPS was 12%. Since neither volatilized component nor additional component is involved in this reaction, there is no change in weight of the reaction mixture. The substrate concentration is accordingly regarded as being kept equal to that of the raw material mixture (a-2).

This comparative example uses the same raw material mixture (a-2) as that of Example 2 and has the reaction time of 2 hours, which is equal to the average retention time in synthesis of cyclic PAS in Example 2. The formation rate of cyclic PPS in this comparative example is, however, lower than that in Example 2. Comparison between the results of Example 2 and the results of Comparative Example 2 proves the advantageous effect of the invention; i.e., continually performing the operation A and the operation B improves the formation rate of cyclic polyarylene sulfide, compared with the formation rate in the batch system.

Example 3

The following describes an example of increasing the volume of the organic polar solvent in the raw material mixture (a) and in the reaction mixture (b) compared with Example 1, so as to decrease the substrate concentration.
<Preparation of Raw Material Mixture (a-3)>

After the dehydration operation in the same manner as Example 1, the mixture after removal of water by the foregoing dehydration operation was placed in a 300 liter SUS 316 container (II) equipped with an agitator, and a raw material mixture (a-3) was prepared by further adding 395 kg (385 liters) of NMP and 18.4 kg (125 mol) of p-dichlorobenzene (p-DCB). Accordingly, the substrate concentration of sulfur content expressed by the volume of the organic polar solvent in the raw material mixture (a-3) was 3.34 liters per 1 mol of the sulfur content. The substrate concentration of arylene unit expressed by the volume of the organic polar solvent was 3.27 liters per 1 mol of the arylene unit. The amount of the arylene unit in the raw material mixture (a-3) was 1.02 mol per 1 mol of the sulfur content. In the container (II), the raw material mixture (a-3) was maintained at the internal temperature of 140° C. with stirring.
<Preparation of Initial Reaction Mixture>

The raw material mixture (a-3) of 40 kg prepared as described above was supplied into a 70 liter SUS 316 container (III) equipped with an agitator, was sealed in nitrogen, was heated to the internal temperature of 250° C. and was then kept at this raised temperature for 2 hours for an initial reaction. This gave an initial reaction mixture. The pressure in the container (III) after the initial reaction was 0.4 MPa. The initial reaction mixture was sampled and analyzed. According to the results of analysis, the concentration of the unreacted sulfidizing agent in the initial reaction mixture or more specifically the amount of the unreacted sulfidizing agent included in 1 kilogram of the initial reaction mixture was 0.014 mol. The ratio of the sulfidizing agent concentration of the initial reaction mixture to the sulfidizing agent concentration of the raw material mixture (a-3) was 5%. The concentration of the unreacted dihalogenated aromatic compound in the initial reaction mixture or more specifically the amount of the unreacted dihalogenated aromatic compound included in 1 kilogram of the initial reaction mixture was 0.017 mol. The ratio of the dihalogenated aromatic compound concentration of the initial reaction mixture to the dihalogenated aromatic compound concentration of the raw material mixture (a-3) was 6%. The formation rate of cyclic PPS was 18%. Since neither volatilized component nor additional component is involved in this reaction, there is no change in weight of the initial reaction mixture. The substrate concentration is accordingly regarded as being kept equal to that of the raw material mixture (a-3).

<Synthesis of Cyclic PAS>

The raw material mixture (a-3) was continuously supplied at a rate of 20 kg/hour from the container (II) to the container (III) including the above initial reaction mixture by using the slurry sealing-type canned motor pump, while the internal temperature of the container (III) was maintained at 250° C. (operation A). Simultaneously, the reaction mixture (b) was continuously withdrawn from the container (III) at a rate of 20 kg/hour by using the slurry sealing-type canned motor pump (operation B), was cooled down to or below 200° C. in the piping and was transferred to the container (IV) as the receiving container, so as to obtain a mixture including cyclic PPS. This series of operations was continued for 10 hours.

During this series of operations, the pressure in the container (III) was kept constant at 0.4 MPa. The container (II) had neither addition of a component nor volatilization of a component other than supply of the raw material mixture (a-3). The container (III) had neither addition of a component nor volatilization of a component other than supply of the raw material mixture (a-3) and withdrawal of the reaction mixture (b). The substrate concentration of the reaction mixture (b) in the container (III) is accordingly regarded as being equal to that of the initial reaction mixture and as being kept constant. The liquid surface of the container (III) was unchanged, so that the amount of the reaction mixture (b) is also regarded as being kept constant.

At the times of 5 hours and 10 hours after the start of this series of operations, the reaction mixture (b) was sampled from the container (III) and analyzed. At the time of 5 hours after, the concentration of the unreacted sulfidizing agent in the reaction mixture (b) or more specifically the amount of the unreacted sulfidizing agent included in 1 kilogram of the reaction mixture (b) was 0.008 mol. The ratio of the sulfidizing agent concentration of the reaction mixture (b) to the sulfidizing agent concentration of the raw material mixture (a-3) was 3%. The concentration of the unreacted dihalogenated aromatic compound in the reaction mixture (b) or more specifically the amount of the unreacted dihalogenated aromatic compound included in 1 kilogram of the reaction mixture (b) was 0.011 mol. The ratio of the dihalogenated aromatic compound concentration of the reaction mixture (b) to the dihalogenated aromatic compound concentration of the raw material mixture (a-3) was 4%. The formation rate of cyclic PPS was 20%. At the time of 10 hours after, the concentration of the unreacted sulfidizing agent in the reaction mixture (b) or more specifically the amount of the unreacted sulfidizing agent included in 1 kilogram of the reaction mixture (b) was 0.006 mol. The ratio of the sulfidizing agent concentration of the reaction mixture (b) to the sulfidizing agent concentration of the raw material mixture (a-3) was 2%. The concentration of the unreacted dihalogenated aromatic compound in the reaction mixture (b) or more specifically the amount of the unreacted dihalogenated aromatic compound included in 1 kilogram of the reaction mixture (b) was 0.008 mol. The ratio of the dihalogenated aromatic compound concentration of the reaction mixture (b) to the dihalogenated aromatic compound concentration of the raw material mixture (a-3) was 3%. The formation rate of cyclic PPS was 21%.

The results of this example show that decreasing the substrate concentration in the reaction mixture compared with Example 1 enables the cyclic PPS to be continuously produced at the higher formation rate. This method accordingly ensures synthesis of cyclic PPS with high efficiency.

Comparative Example 3

The following describes an example of synthesizing cyclic PAS in the batch system without supply of the raw material mixture (a) (operation A) and withdrawal of the reaction mixture (b) (operation B).

The raw material mixture (a-3) of 40 kg prepared in Example 3 described above was supplied into a 70 liter SUS 316 container (III) equipped with an agitator, was sealed in nitrogen, was heated to the internal temperature of 250° C. and was then kept at this raised temperature for 2 hours for a polymerization reaction. This gave a reaction mixture including a reaction product. The pressure in the container (III) after the reaction was 0.4 MPa. The obtained reaction mixture was sampled and analyzed. According to the results of analysis, the concentration of the unreacted sulfidizing agent in the reaction mixture or more specifically the amount of the unreacted sulfidizing agent included in 1 kilogram of the reaction mixture was 0.014 mol. The ratio of the sulfidizing agent concentration of the reaction mixture to the sulfidizing agent concentration of the raw material mixture (a-3) was 5%. The concentration of the unreacted dihalogenated aromatic compound in the reaction mixture or more specifically the amount of the unreacted dihalogenated aromatic compound included in 1 kilogram of the reaction mixture was 0.017 mol. The ratio of the dihalogenated aromatic compound concentration of the reaction mixture to the dihalogenated aromatic compound concentration of the raw material mixture (a-3) was 6%. The formation rate of cyclic PPS was 18%. Since neither volatilized component nor additional component is involved in this reaction, there is no change in weight of the reaction mixture. The substrate concentration is accordingly regarded as being kept equal to that of the raw material mixture (a-3).

This comparative example uses the same raw material mixture (a-3) as that of Example 3 and has the reaction time of 2 hours, which is equal to the average retention time in synthesis of cyclic PAS in Example 3. The formation rate of cyclic PPS in this comparative example is, however, lower than that in Example 3. Comparison between the results of Example 3 and the results of Comparative Example 3 proves the advantageous effect of the invention; i.e., continually performing the operation A and the operation B improves the formation rate of cyclic polyarylene sulfide, compared with the formation rate in the batch system.

Example 4

The following describes an example of decreasing the volume of the organic polar solvent in the raw material mixture (a) and in the reaction mixture (b) compared with Example 1, so as to increase the substrate concentration.

<Preparation of Raw Material Mixture (a-4)>

After the dehydration operation in the same manner as Example 1, the mixture after removal of water by the foregoing dehydration operation was placed in a 300 liter SUS 316 container (II) equipped with an agitator, and a raw material mixture (a-4) was prepared by further adding 155 kg (151 liters) of NMP and 18.4 kg (125 mol) of p-dichlorobenzene (p-DCB). Accordingly, the substrate concentration of sulfur content expressed by the volume of the organic polar solvent in the raw material mixture (a-4) was 1.43 liters per 1 mol of the sulfur content. The substrate concentration of arylene unit expressed by the volume of the organic polar solvent was 1.40 liters per 1 mol of the arylene unit. The amount of the arylene unit in the raw material mixture (a-4) was 1.02 mol per 1 mol of the sulfur content. In the container (II), the raw material mixture (a-4) was maintained at the internal temperature of 140° C. with stirring.

<Preparation of Initial Reaction Mixture>

The raw material mixture (a-4) of 40 kg prepared as described above was supplied into a 70 liter SUS 316 container (III) equipped with an agitator, was sealed in nitrogen, was heated to the internal temperature of 250° C. and was then kept at this raised temperature for 2 hours for an initial reaction. This gave an initial reaction mixture. The pressure in the container (III) after the initial reaction was 0.4 MPa. The initial reaction mixture was sampled and analyzed. According to the results of analysis, the concentration of the unreacted sulfidizing agent in the initial reaction mixture or more specifically the amount of the unreacted sulfidizing agent included in 1 kilogram of the initial reaction mixture was 0.017 mol. The ratio of the sulfidizing agent concentration of the initial reaction mixture to the sulfidizing agent concentration of the raw material mixture (a-4) was 3%. The concentration of the unreacted dihalogenated aromatic compound in the initial reaction mixture or more specifically the amount of the unreacted dihalogenated aromatic compound included in 1 kilogram of the initial reaction mixture was 0.024 mol. The ratio of the dihalogenated aromatic compound concentration of the initial reaction mixture to the dihalogenated aromatic compound concentration of the raw material mixture (a-4) was 4%. The formation rate of cyclic PPS was 10%. Since neither volatilized component nor additional component is involved in this reaction, there is no change in weight of the initial reaction mixture. The substrate concentration is accordingly regarded as being kept equal to that of the raw material mixture (a-4).

<Synthesis of Cyclic PAS>

The raw material mixture (a-4) was continuously supplied at a rate of 20 kg/hour from the container (II) to the container (III) including the above initial reaction mixture by using the slurry sealing-type canned motor pump, while the internal temperature of the container (III) was maintained at 250° C. (operation A). Simultaneously, the reaction mixture (b) was continuously withdrawn from the container (III) at a rate of 20 kg/hour by using the slurry sealing-type canned motor pump (operation B), was cooled down to or below 200° C. in the piping and was transferred to the container (IV) as the receiving container, so as to obtain a mixture including cyclic PPS. This series of operations was continued for 5 hours.

During this series of operations, the pressure in the container (III) was kept constant at 0.4 MPa. The container (II) had neither addition of a component nor volatilization of a component other than supply of the raw material mixture (a-4). The container (III) had neither addition of a component nor volatilization of a component other than supply of the raw material mixture (a-4) and withdrawal of the reaction mixture (b). The substrate concentration of the reaction mixture (b) in the container (III) is accordingly regarded as being equal to that of the initial reaction mixture and as being kept constant. The liquid surface of the container (III) was unchanged, so that the amount of the reaction mixture (b) is also regarded as being kept constant.

At the time of 5 hours after the start of this series of operations, the reaction mixture (b) was sampled from the container (III) and analyzed. According to the results of the analysis, the concentration of the unreacted sulfidizing agent in the reaction mixture (b) or more specifically the amount of the unreacted sulfidizing agent included in 1 kilogram of the reaction mixture (b) was 0.012 mol. The ratio of the sulfidizing agent concentration of the reaction mixture (b) to the sulfidizing agent concentration of the raw material mixture (a-4) was 2%. The concentration of the unreacted dihalogenated aromatic compound in the reaction mixture (b) or more specifically the amount of the unreacted dihalogenated aromatic compound included in 1 kilogram of the reaction mixture (b) was 0.018 mol. The ratio of the dihalogenated aromatic compound concentration of the reaction mixture (b) to the dihalogenated aromatic compound concentration of the raw material mixture (a-4) was 3%. The formation rate of cyclic PPS was 12%.

The results of this example show that the formation rate of the cyclic PPS has a decreasing tendency by increasing the substrate concentration in the reaction mixture (b) compared with Example 1 but is still in a desirable range. This method accordingly ensures synthesis of cyclic PPS with high efficiency.

Comparative Example 4

The following describes an example of synthesizing cyclic PAS in the batch system without supply of the raw material mixture (a) (operation A) and withdrawal of the reaction mixture (b) (operation B).

The raw material mixture (a-4) of 40 kg prepared in Example 4 described above was supplied into a 70 liter SUS 316 container (III) equipped with an agitator, was sealed in nitrogen, was heated to the internal temperature of 250° C. and was then kept at this raised temperature for 2 hours for a polymerization reaction. This gave a reaction mixture including a reaction product. The pressure in the container (III) after the reaction was 0.4 MPa. The obtained reaction mixture was sampled and analyzed. According to the results of analysis, the concentration of the unreacted sulfidizing agent in the reaction mixture or more specifically the amount of the unreacted sulfidizing agent included in 1 kilogram of the reaction mixture was 0.017 mol. The ratio of the sulfidizing agent concentration of the reaction mixture to the sulfidizing agent concentration of the raw material mixture (a-4) was 3%. The concentration of the unreacted dihalogenated aromatic compound in the reaction mixture or more specifically the amount of the unreacted dihalogenated aromatic compound included in 1 kilogram of the reaction mixture was 0.024 mol. The ratio of the dihalogenated aromatic compound concentration of the reaction mixture to the dihalogenated aromatic compound concentration of the raw material mixture (a-4) was 4%. The formation rate of cyclic PPS was 10%. Since neither volatilized component nor additional component is involved in this reaction, there is no change in weight of the reaction mixture. The substrate concentration is accordingly regarded as being kept equal to that of the raw material mixture (a-4).

This comparative example uses the same raw material mixture (a-4) as that of Example 4 and has the reaction time of 2 hours, which is equal to the average retention time in synthesis of cyclic PAS in Example 4. The formation rate of cyclic PPS in this comparative example is, however, lower. Comparison between the results of Example 4 and the results of Comparative Example 4 proves the advantageous effect of the invention; i.e., continually performing the operation A and the operation B improves the formation rate of cyclic polyarylene sulfide, compared with the formation rate in the batch system.

Example 5

The following describes an example of increasing the amount of the raw material mixture (a) supplied in the operation A and the amount of the reaction mixture (b) withdrawn in the operation B compared with Example 1, so as to shorten the average retention time of the reaction mixture (b).

The operation (A) and the operation (B) were continued for 5 hours in the same manner as Example 1, except that the supply rate of the raw material mixture (a-1) and the withdrawal rate of the reaction mixture (b) in synthesis of cyclic PAS of Example 1 were respectively changed from 20 kg/hour to 40 kg/hour. Accordingly, the average retention time was 1 hour in Example 5.

During this series of operations, the pressure in the container (III) was kept constant at 0.4 MPa. The container (II) had neither addition of a component nor volatilization of a component other than supply of the raw material mixture (a-1). The container (III) had neither addition of a component nor volatilization of a component other than supply of the raw material mixture (a-1) and withdrawal of the reaction mixture (b). The substrate concentration of the reaction mixture (b) in the container (III) is accordingly regarded as being equal to that of the initial reaction mixture and as being kept constant. The liquid surface of the container (III) was unchanged, so that the amount of the reaction mixture (b) is also regarded as being kept constant.

At the time of 5 hours after the start of this series of operations, the reaction mixture (b) was sampled from the container (III) and analyzed. According to the results of the analysis, the concentration of the unreacted sulfidizing agent in the reaction mixture (b) or more specifically the amount of the unreacted sulfidizing agent included in 1 kilogram of the reaction mixture (b) was 0.049 mol. The ratio of the sulfidizing agent concentration of the reaction mixture (b) to the sulfidizing agent concentration of the raw material mixture (a-1) was 11%. The concentration of the unreacted dihalogenated aromatic compound in the reaction mixture (b) or more specifically the amount of the unreacted dihalogenated aromatic compound included in 1 kilogram of the reaction mixture (b) was 0.059 mol. The ratio of the dihalogenated aromatic compound concentration of the reaction mixture (b) to the dihalogenated aromatic compound concentration of the raw material mixture (a-1) was 13%. The formation rate of cyclic PPS was 15%.

The results of this example show that the concentration of the unreacted sulfidizing agent and the concentration of the unreacted dihalogenated aromatic compound are increased by shortening the average retention time of the reaction mixture (b) compared with Example 1 but are still in desirable ranges. The formation rate of the cyclic PPS has a decreasing tendency in this example, but this method still ensures synthesis of cyclic PPS with high efficiency.

Comparative Example 5

The following describes an example of synthesizing cyclic PAS in the batch system without supply of the raw material mixture (a) (operation A) and withdrawal of the reaction mixture (b) (operation B).

The raw material mixture (a-1) of 40 kg prepared in Example 1 described above was supplied into a 70 liter SUS 316 container (III) equipped with an agitator, was sealed in nitrogen, was heated to the internal temperature of 250° C. and was then kept at this raised temperature for 1 hour for a polymerization reaction. This gave a reaction mixture including a reaction product. The pressure in the container (III) after the reaction was 0.4 MPa. The obtained reaction mixture was sampled and analyzed. According to the results of analysis, the concentration of the unreacted sulfidizing agent in the reaction mixture or more specifically the amount of the unreacted sulfidizing agent included in 1 kilogram of the reaction mixture was 0.053 mol. The ratio of the sulfidizing agent concentration of the reaction mixture to the sulfidizing agent concentration of the raw material mixture (a-1) was 12%. The concentration of the unreacted dihalogenated aromatic compound in the reaction mixture or more specifically the amount of the unreacted dihalogenated aromatic compound included in 1 kilogram of the reaction mixture was 0.068 mol. The ratio of the dihalogenated aromatic compound concentration of the reaction mixture to the dihalogenated aromatic compound concentration of the raw material mixture (a-1) was 15%. The formation rate of cyclic PPS was 13%. Since neither volatilized component nor additional component is involved in this reaction, there is no change in weight of the reaction mixture. The substrate concentration is accordingly regarded as being kept equal to that of the raw material mixture (a-1).

This comparative example uses the same raw material mixture (a-1) as that of Example 5 and has the reaction time of 1 hour, which is equal to the average retention time in synthesis of cyclic PAS in Example 5. The formation rate of cyclic PPS in this comparative example is, however, lower than that in Example 5. Comparison between the results of Example 5 and the results of Comparative Example 5 proves the advantageous effect of the invention; i.e., continually performing the operation A and the operation B improves the formation rate of cyclic polyarylene sulfide, compared with the formation rate in the batch system.

Example 6

The following describes an example of additionally performing an operation (D) that further heats the reaction mixture (b) withdrawn from the reaction vessel.

In this example, the device configuration described above was changed to the following configuration. A container (V) having the same structure as that of the container (III) was placed between the container (III) and the container (IV). The container (III), the container (V) and the container (IV) were linked in this sequence via slurry sealing-type canned motor pumps. With regard to linkage between the container (V) and the container (IV), piping equipped with a cooling mechanism was placed between the slurry sealing-type canned motor pump and the container (V).

In this device configuration, after the same series of operation as that of Example 1, the operation (A) and the operation (B) were started in the container (III). The reaction mixture (b) withdrawn from the container (III) was supplied to the container (V), which included in advance the supply of the reaction mixture (b) obtained by Example 1 and was heated to 250° C., and was further heated at 250° C. (operation D), so as to obtain a reaction mixture (c). The reaction mixture (c) was continuously withdrawn at a rate of 20 kg/hour, was cooled down to or below 200° C. in the piping and was transferred to the container (IV), so as to obtain a mixture including cyclic PPS. This series of operations was continued for 10 hours.

At the times of 5 hours and 10 hours after the start of this series of operations, the reaction mixture (c) was sampled from the container (V) and analyzed. According to the results of analysis, at both the time of 5 hours after and the time of 10 hours after, the concentration of the unreacted sulfidizing agent in the reaction mixture (c) or more specifically the amount of the unreacted sulfidizing agent included in 1 kilogram of the reaction mixture (c) was 0.004 mol. The ratio of the sulfidizing agent concentration of the reaction mixture (c) to the sulfidizing agent concentration of the raw material mixture (a-1) was 1%. The concentration of the unreacted dihalogenated aromatic compound in the reaction mixture (c) or more specifically the amount of the unreacted dihalogenated aromatic compound included in 1 kilogram of the reaction mixture (c) was 0.009 mol. The ratio of the dihalogenated aromatic compound concentration of the reaction mixture (c) to the dihalogenated aromatic compound concentration of the raw material mixture (a-1) was 2%. The formation rate of cyclic PPS was 18%.

The results of this example show that further heating and reacting the reaction mixture (b) is likely to increase consumption of the unreacted raw material components and improve the formation rate of cyclic polyarylene sulfide.

Example 7

The following describes an example of varying the substrate concentration.

After continuation of the operation (A) and the operation (B) for 5 hours using the device shown in FIG. 1 in the same manner as Example 1, the raw material mixture (a-1) was diluted to a raw material mixture (a-5) by adding 85.0 kg (82.9 liters) of NMP at once to the container (II). Accordingly, the substrate concentration of sulfur content expressed by the volume of the organic polar solvent in the raw material mixture was changed from 1.96 liters to 3.33 liters per 1 mol of the sulfur content. The substrate concentration of the arylene unit expressed by the volume of the organic polar solvent in the raw material mixture was also changed from 1.92 liters to 3.26 liters per 1 mol of the arylene unit. The amount of the arylene unit to the sulfur content in the raw material mixture was unchanged at 1.02 mol per 1 mol of the sulfur content.

The operation (A) and the operation (B) were further continued for another 5 hours using the raw material mixture (a-5) in the similar manner. During this series of operations, the pressure in the container (III) was kept constant at 0.4 MPa. The container (H) had neither addition of a component nor volatilization of a component other than supply of the raw material mixture (a-5). The container (III) had neither addition of a component nor volatilization of a component other than supply of the raw material mixture (a-5) and withdrawal of the reaction mixture (b). The substrate concentration of the reaction mixture (b) in the container (III) is accordingly regarded as gradually decreasing to approximately the same level as that of the raw material mixture (a-5). The liquid surface of the container (III) was unchanged, so that the amount of the reaction mixture (b) is regarded as being kept constant.

At the time of 5 hours after the start of this series of operations (i.e., after elapse of 10 hours since start of the supply of the raw material mixture (a-1)), the reaction mixture (b) was sampled from the container (III) and analyzed. According to the results of analysis, the concentration of the unreacted sulfidizing agent in the reaction mixture (b) or more specifically the amount of the unreacted sulfidizing agent included in 1 kilogram of the reaction mixture (b) was 0.005 mol. The ratio of the sulfidizing agent concentration of the reaction mixture (b) to the sulfidizing agent concentration of the raw material mixture (a-5) was 2%. The concentration of the unreacted dihalogenated aromatic compound in the reaction mixture (b) or more specifically the amount of the unreacted dihalogenated aromatic compound included in 1 kilogram of the reaction mixture (b) was 0.008 mol. The ratio of the dihalogenated aromatic compound concentration of the reaction mixture (b) to the dihalogenated aromatic compound concentration of the raw material mixture (a-5) was 3%. The formation rate of cyclic PPS was 20%.

According to the results of Example 1 and this example, it is shown that varying the substrate concentration in the desirable range of the invention changes the formation rate of cyclic PPS but still ensures synthesis of cyclic polyarylene sulfide with high efficiency.

Example 8

The following describes an example of preparing an initial reaction mixture in a system that performs an operation of introducing the organic polar solvent to the reaction vessel and supplying the raw material mixture (a) into the reaction vessel in parallel with an operation of withdrawing part of the reaction mixture from the reaction vessel, instead of the batch system described in Example 1.

<Preparation of Initial Reaction Mixture>

After 20 kg of NMP was supplied to a 70 liter SUS 316 container (III) equipped with an agitator, was sealed in nitrogen and was heated to the internal temperature of 250° C., the raw material mixture (a-1) prepared in the container (II) in the same manner as Example 1 was continuously supplied to the container (III) at a rate of 10 kg/hour by using the slurry sealing-type canned motor pump. Simultaneously, an initial reaction mixture including a reaction product was continuously withdrawn from the container (III) at a rate of 20 kg/hour by using the slurry sealing-type canned motor pump, was cooled down to or below 200° C. in the piping and was transferred to the container (IV). The operations for the initial reaction of continuously supplying the raw material mixture (a-1) to the container (III) and continuously withdrawing the initial reaction mixture from the container (III) were continued for 12 hours.

The initial reaction mixture was sampled and analyzed. According to the results of analysis, at the time of 2 hours after, the concentration of the unreacted sulfidizing agent in the initial reaction mixture or more specifically the amount of the unreacted sulfidizing agent included in 1 kilogram of the initial reaction mixture was 0.057 mol. The ratio of the sulfidizing agent concentration of the initial reaction mixture to the sulfidizing agent concentration of the raw material mixture (a-1) was 13%. The concentration of the unreacted dihalogenated aromatic compound in the initial reaction mixture or more specifically the amount of the unreacted dihalogenated aromatic compound included in 1 kilogram of the initial reaction mixture was 0.068 mol. The ratio of the dihalogenated aromatic compound concentration of the initial reaction mixture to the dihalogenated aromatic compound concentration of the raw material mixture (a-1) was 15%. The formation rate of cyclic PPS was 9%. At the time of 12 hours after, the concentration of the unreacted sulfidizing agent in the initial reaction mixture or more specifically the amount of the unreacted sulfidizing agent included in 1 kilogram of the initial reaction mixture was 0.018 mol. The ratio of the sulfidizing agent concentration of the initial reaction mixture to the sulfidizing agent concentration of the raw material mixture (a-1) was 4%. The concentration of the unreacted dihalogenated aromatic compound in the initial reaction mixture or more specifically the amount of the unreacted dihalogenated aromatic compound included in 1 kilogram of the initial reaction mixture was 0.023 mol. The ratio of the dihalogenated aromatic compound concentration of the initial reaction mixture to the dihalogenated aromatic compound concentration of the raw material mixture (a-1) was 5%. The formation rate of cyclic. PPS reached 15% indicating the composition equivalent to the initial reaction mixture of Example 1.

With regard to preparation of the initial reaction mixture, the initial reaction mixture prepared by the method of this example is equivalent to the initial reaction mixture prepared in Example 1. The method of this example, however, takes a longer time, compared with the batch system in Example 1. This shows that preparation in the batch system is more efficient.

REFERENCE SIGNS LIST 10 reaction device
20 flow path
22 branch line
24 branch line
42 circulation line
44 circulation line

The invention claimed is:

1. A production method of a cyclic polyarylene sulfide by heating and reacting a raw material mixture (a) including at least a sulfidizing agent, a dihalogenated aromatic compound and an organic polar solvent,
the production method continually performing each of an operation (A) of supplying the raw material mixture (a) to a reaction mixture (b) in a reaction vessel which includes a reaction product obtained from the raw material mixture (a), an operation (B) of withdrawing part of the reaction mixture (b) from the reaction vessel, and an operation (C) of heating the reaction vessel,
wherein a volume of the organic polar solvent including in the reaction mixture (b) is not less than 1.25 liters and not greater than 50 liters per 1 mol of sulfur content in the reaction mixture (b), and
wherein a concentration of unreacted sulfidizing agent and a concentration of unreacted dihalogenated aromatic compound included in the reaction mixture (b) in the reaction vessel are respectively maintained to be not higher than 30% of a concentration of the sulfidizing agent and a concentration of the dihalogenated aromatic compound included in the raw material mixture (a).

2. The production method of the cyclic polyarylene sulfide according to claim 1,
wherein a substrate concentration of each of a sulfur content and an arylene unit included in the reaction mixture (b) in the reaction vessel is maintained constant.

3. The production method of the cyclic polyarylene sulfide according to claim 1,
the production method performing the operation (A) and the operation (B) simultaneously.

4. The production method of the cyclic polyarylene sulfide according to claim 1,
the production method performing the operation (A) and the operation (B) continuously.

5. The production method of the cyclic polyarylene sulfide according to claim 1,
wherein an amount of the reaction mixture (b) in the reaction vessel is kept constant.

6. The production method of the cyclic polyarylene sulfide according to claim 1,
wherein an amount of the unreacted sulfidizing agent and an amount of the unreacted dihalogenated aromatic compound included in 1 kilogram of the reaction mixture (b) are respectively maintained to be not greater than 0.15 mol.

7. The production method of the cyclic polyarylene sulfide according to claim 1,
the production method additionally performing an operation (D) of heating the reaction mixture (b) withdrawn from the reaction vessel by the operation (B).

8. The production method of the cyclic polyarylene sulfide according to claim 1,
wherein the operation (C) heats the reaction vessel at a temperature exceeding a reflux temperature under ordinary pressure.

9. The production method of the cyclic polyarylene sulfide according to claim 1,
wherein the dihalogenated aromatic compound is dichlorobenzene.

10. The production method of the cyclic polyarylene sulfide according to claim 1,
wherein the sulfidizing agent is an alkali metal sulfide.

11. The production method of the cyclic polyarylene sulfide according to claim 1,
wherein the raw material mixture (a) includes a linear polyarylene sulfide.

12. The production method of the cyclic polyarylene sulfide according to claim 1,
the production method starting the operation (A) and the operation (B) after obtaining the reaction mixture (b) in advance by reaction of the raw material mixture (a) in a batch system.

13. The production method of the cyclic polyarylene sulfide according to claim 1,
wherein the operation (B) uses a centrifugal pump to adjust an amount of withdrawal of the reaction mixture (b).

14. The production method of the cyclic polyarylene sulfide according to claim 1,
wherein the reaction vessel is provided with a circulation line connected with the reaction vessel and arranged to circulate the reaction mixture (b) into and from the reaction vessel by using a pump, and
the operation (B) withdraws the reaction mixture (b) from the reaction vessel via the circulation line.

15. The production method of the cyclic polyarylene sulfide according to claim 1,
wherein the reaction vessel is linked by a pressure equalizing line with a supply container connected with the reaction vessel and configured to supply the raw material mixture (a) to the reaction vessel by the operation (A) and/or a receiving container connected with the reaction vessel and configured to receive a supply of the reaction mixture (b) withdrawn from the reaction vessel by the operation (B), so that pressures in the reaction vessel and the supply container and/or the receiving container are equalized.

* * * * *